United States Patent [19]
Bliss et al.

[11] Patent Number: 5,266,017
[45] Date of Patent: * Nov. 30, 1993

[54] CONNECTING ASSEMBLY IN A ROTARY PRESS

[75] Inventors: Eric M. Bliss, Lexington, N.C.; William G. Wunder, Sr., Hamilton, Mich.

[73] Assignee: Nabisco, Inc., Parsippany, N.J.

[*] Notice: The portion of the term of this patent subsequent to Aug. 25, 2009 has been disclaimed.

[21] Appl. No.: 847,510

[22] Filed: Mar. 6, 1992

Related U.S. Application Data

[63] Continuation of Ser. No. 487,500, Mar. 1, 1990, Pat. No. 5,141,425.

[51] Int. Cl.$^5$ .................. B29C 43/32; B30B 11/08; B30B 15/06
[52] U.S. Cl. .................. 425/193; 425/233; 425/353; 425/354; 425/406; 425/453
[58] Field of Search ............ 425/192 R, 193, 233, 425/352, 353, 354, 355, 359, 360, 361, 451, 292, 294, 296, 406, 358, 408, 411, 423; 100/246, 238, 239, 264

[56] References Cited

U.S. PATENT DOCUMENTS

| | | |
|---|---|---|
| 3,891,375 | 6/1975 | Pilewski et al. .................. 425/344 |
| 4,053,267 | 10/1977 | DeSantis .................. 425/78 |
| 4,403,935 | 5/1983 | Crossley et al. .................. 425/259 |
| 4,427,352 | 1/1984 | DeSantis et al. .................. 425/352 |
| 4,988,275 | 1/1991 | Hinzpeter et al. .................. 425/186 |
| 5,141,425 | 8/1992 | Bliss et al. .................. 425/453 |

FOREIGN PATENT DOCUMENTS

| | | |
|---|---|---|
| 61-10421 | 1/1986 | Japan . |
| 837908 | 6/1981 | U.S.S.R. . |
| 1404353 | 6/1988 | U.S.S.R. . |

*Primary Examiner*—Jay H. Woo
*Assistant Examiner*—Khanh P. Nguyen

[57] ABSTRACT

A connecting assembly for connecting a multitude of axially extending punches to a rotatable punch drive plate in a rotary press having a die plate supported for rotation in a given plane and forming a multitude of die cavities. Each of the multitude of punches is supported for axial reciprocating movement in an associated respective one of the die cavities, and the drive plate engages the punches and has a generally flat shape extending at an angle to said given plane, and rotation of the die plate and the drive plate reciprocates the punches in the die cavities. The connecting assembly connects each punch to the punch drive plate for limited swinging movement to maintain the punch axially aligned with the associated one of the die cavities as the die plate and the drive plate rotates.

15 Claims, 20 Drawing Sheets

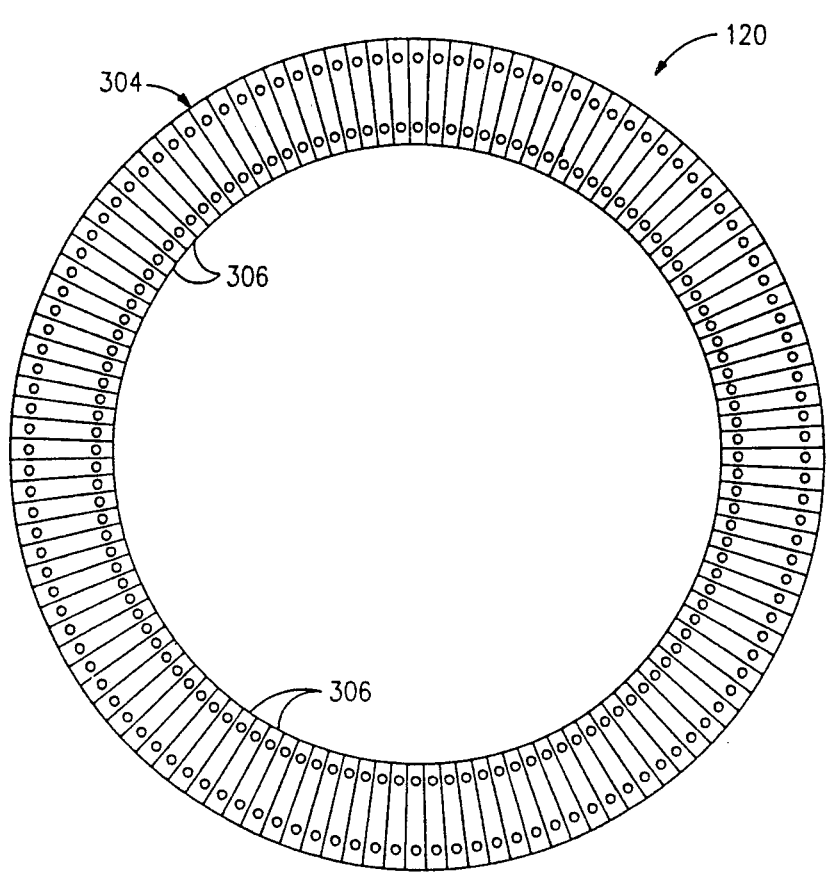
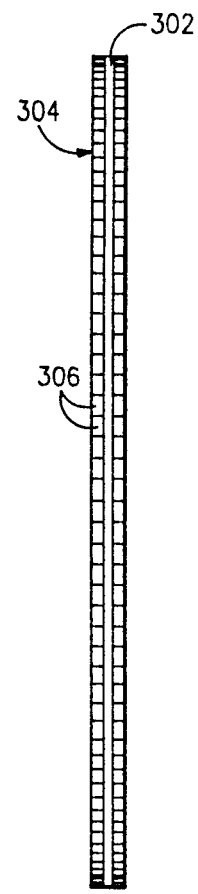
FIG.15  FIG.16
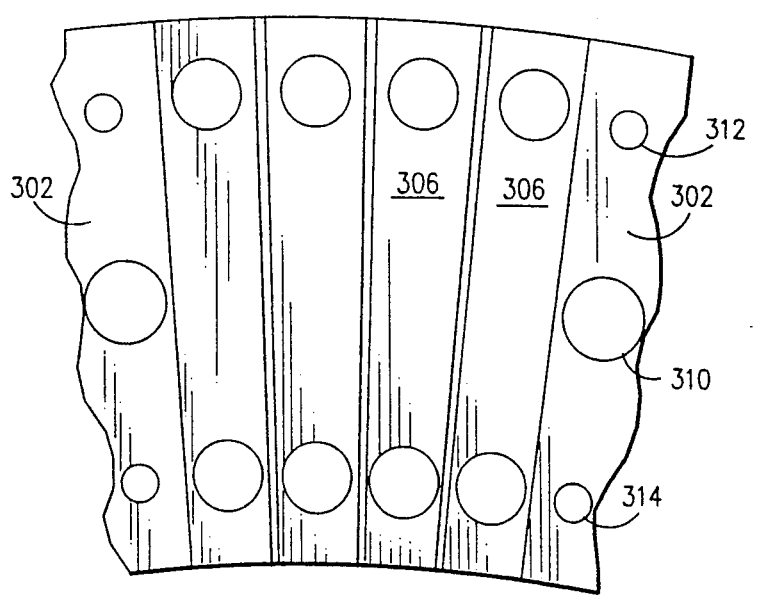
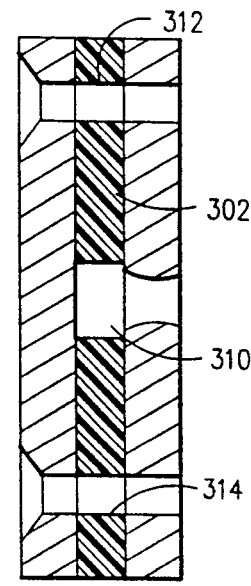
FIG.17  FIG.18

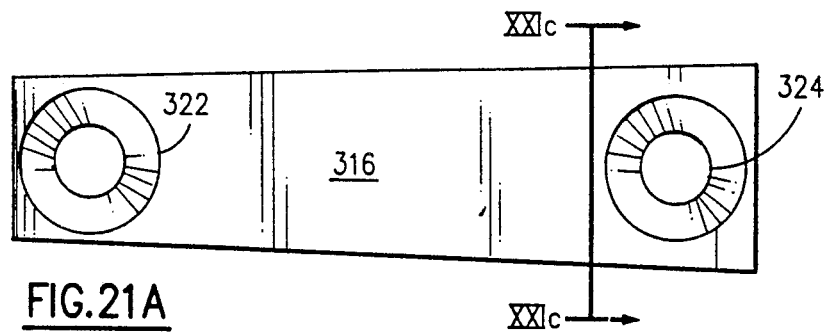
FIG.21A
FIG.21C
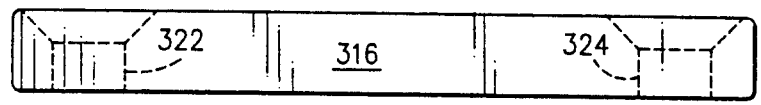
FIG.21B
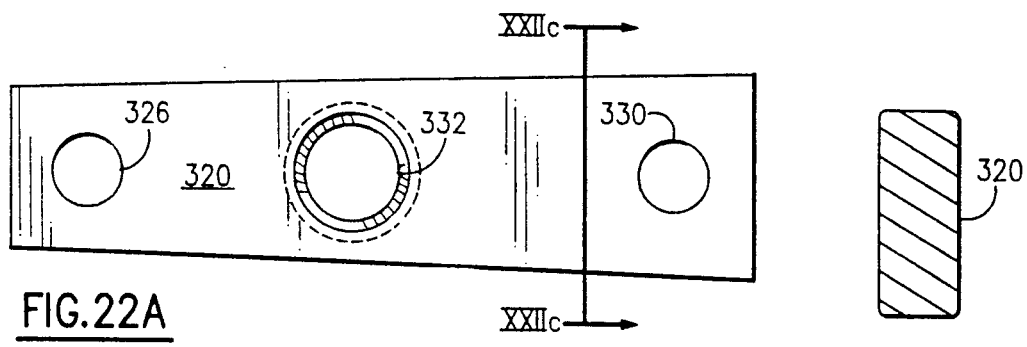
FIG.22A
FIG.22C
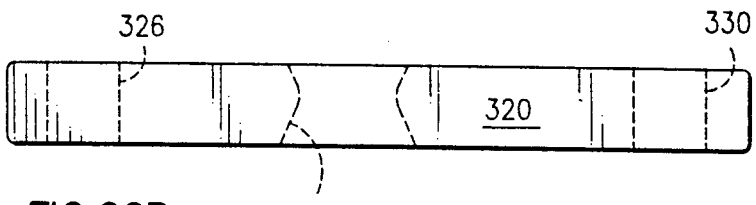
FIG.22B
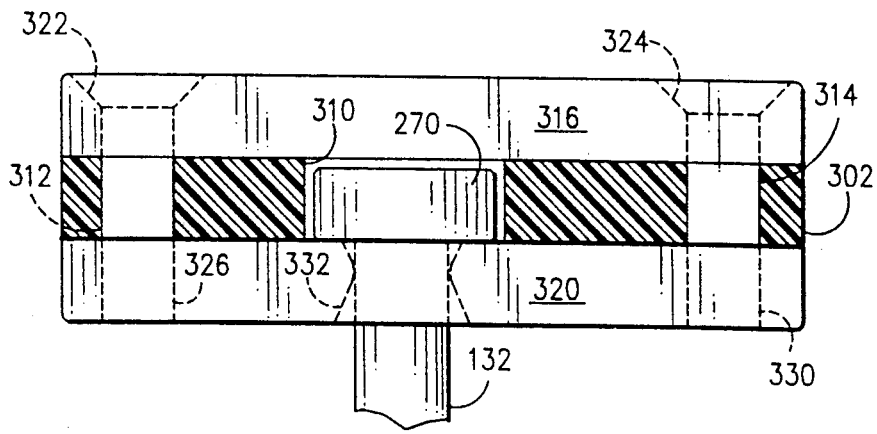
FIG.23

CONNECTING ASSEMBLY IN A ROTARY PRESS

This is a continuation of copending application Ser. No. 487,500, filed on Mar. 1, 1990, now U.S. Pat. No. 5,161,425.

BACKGROUND OF THE INVENTION

This application relates to copending application Ser. No. 487,499, now U.S. Pat. No. 5,044,916, filed herewith for "A Support Assembly In A Rotary Press," to copending application Ser. No. 487,485, filed herewith for "A Feed Assembly In A Rotary Press," to copending application Ser. No. 487,486, now U.S. Pat. No. 5,066,211, filed herewith for "A Material Feed Control Assembly In A Rotary Press," and to copending application Ser. No. 487,498, U.S. Pat. No. 5,032,071, filed herewith for "A Material Sensing Assembly In A Rotary Press."

This invention generally relates to a rotary press; and more specifically, to an assembly for connecting a multitude of axially extending punches to a rotatable punch drive plate in a rotary press.

Rotary presses are known for forming a small tablets from food material. Commonly, such presses include a rotary turntable that carries or forms an annular series of die cavities, and first and second sets of punches that are located, respectively, on first and second opposite sides of the turntable and that are carried for rotation therewith. In operation, as the turntable rotates, food material is conducted into the die cavities, and the punches are reciprocated to compress the food material in the die cavities into die tablets and to eject the formed tablets from the die cavities.

These prior art presses typically form the tablets from a free-flowing powder material. In many food manufacturing or shaping processes, a food material is formed in the shape of a flexible, elongated rope, and this rope is then processed to produce the final food product shape. It would be highly desirable to provide a tablet press that may form small tablets from such a rope of food material.

SUMMARY OF THE INVENTION

An object of this invention is to provide an improved rotary press for compressing a food material into tablets.

Another object of the present invention is to provide a rotary press that may be effectively employed to form small tablets from a rope of a food material.

A further object of this invention is to provide a rotary food press with a vertically disposed, rotatable die plate, to support a multitude of plungers for unitary rotation with the die plate and for horizontal reciprocating movement into die cavities in the die plate, and to position a pair of rotatable drive plates at angles to the vertical to engage and to reciprocate those plungers in a desired manner as the die plate and the plungers rotate to force food material into the die plate cavities, to compress the food material therein and then to eject the compressed food material from those cavities.

These and other objects of the present invention are attained with a press for compressing a food material, comprising a support frame, a die plate rotatably supported by the support frame and forming a multitude of die cavities for receiving the food material, and food supply means to conduct the food material to the die cavities from a source of the food material. The press further comprises a first punch assembly rotatably supported by the support frame, located on a first side of the die plate, and including a multitude of first punches supported for axial reciprocating movement; and a second punch assembly rotatably supported by the support frame, located on a second side of the die plate, and including a multitude of second punches supported for axial reciprocating movement. Each of the first and second punches is aligned with one of the die cavities of the die plate.

The press still further comprises a first punch drive plate located adjacent the first punch assembly, a second punch drive plate located adjacent the second punch assembly, and drive means to rotate the die plate and the first and second punch assemblies. As the first and second punch assemblies rotate, the first drive plate reciprocates the first punches and the second drive plate reciprocates the second punches to force food material into the die cavities, to mold the food material therein into tablets and then to eject the formed tablets from the die cavities.

In the preferred press, the drive plates are held in generally flat but non-planar positions; and deviations of the drive plates from precisely planar shapes are used, along with slanted orientations of the drive plates, to move the first and second punches in the desired manner. Support assemblies may be used to hold the drive plates in the desired shapes while also allowing those plates to rotate. Moreover, preferably these support assemblies also allow the drive plates, or at least portions thereof, to flex axially slightly during operation of the press.

Preferably, each of the drive plates comprises a base ring and a connecting assembly; and this connecting assembly, in turn, comprises a multitude of connecting subassemblies. Each of the base rings is rotatably supported by the support frame of the press. The connecting assembly of the first drive plate is provided to connect the first punches to the base ring of that drive plate; and in particular, each of the connecting subassemblies of this drive plate connects a respective one first punch to this base ring. Similarly, the connecting assembly of the second drive plate connects the second punches to the base ring of that drive plate; and more specifically, each of the connecting subassemblies of this drive plate connects a respective one second punch to this base ring.

With a preferred embodiment, the die plate forms an annular groove in communication with the die cavities of the die plate; and the food supply means comprises a feed wheel rotatably supported by the support frame of the press and extending into this annular groove to guide and force food material thereinto. The feed wheel may be provided with a multitude of peripheral notches to help meter the food material into the individual die cavities.

Control means may be provided to control the rate at which the food material is conducted to the die cavities to help maintain constant the amount of food material forced into those cavities In a preferred arrangement, this control means comprises first and second adjacent rollers that form a feed gap therebetween to receive and to conduct a rope of food material between the rollers and into the food supply means. The second roller is also supported for movement toward and away from the first roller; and the control means further includes adjusting means connected to the second roller to move that roller toward and away from the first roller to vary the size of the feed gap and, thereby, to vary the rate at which the rope of the food material is conducted to the food supply means.

Also, material sensing means may be provided to sense the amount of food material in the die cavities and to generate a signal indicating that amount. A preferred material sensing means is adapted to sense relative axial flexing selected portions of the first and second drive plates.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIGS. 16a, 16b, 16c and 16d illustrate the cycle of axial movement of the punches of the rotary press.

FIG. 15 is a side view of one of the punch drive plates of the rotary press.

FIG. 16 is a front view of the punch drive plate illustrated in FIG. 15.

FIG. 17 is an enlarged view of a portion of the drive plate.

FIG. 18 is a cross-sectional view through the drive plate, taken along line XVIII—XVIII of FIG. 17.

FIGS. 21a, 21b and 21c show one member of a connecting subassembly of the drive plate of FIGS. 15 and 16.

FIGS. 22a, 22b and 22c show a second member of the connecting subassembly.

FIG. 23 illustrate how the members of FIGS. 21a, 21b and 21c and 22a, 22b and 22c used to connect a punch to the base ring of FIGS. 19 and 20.

DETAILED DESCRIPTION OF THE PREFERRED EMBODIMENTS

Figure 5:
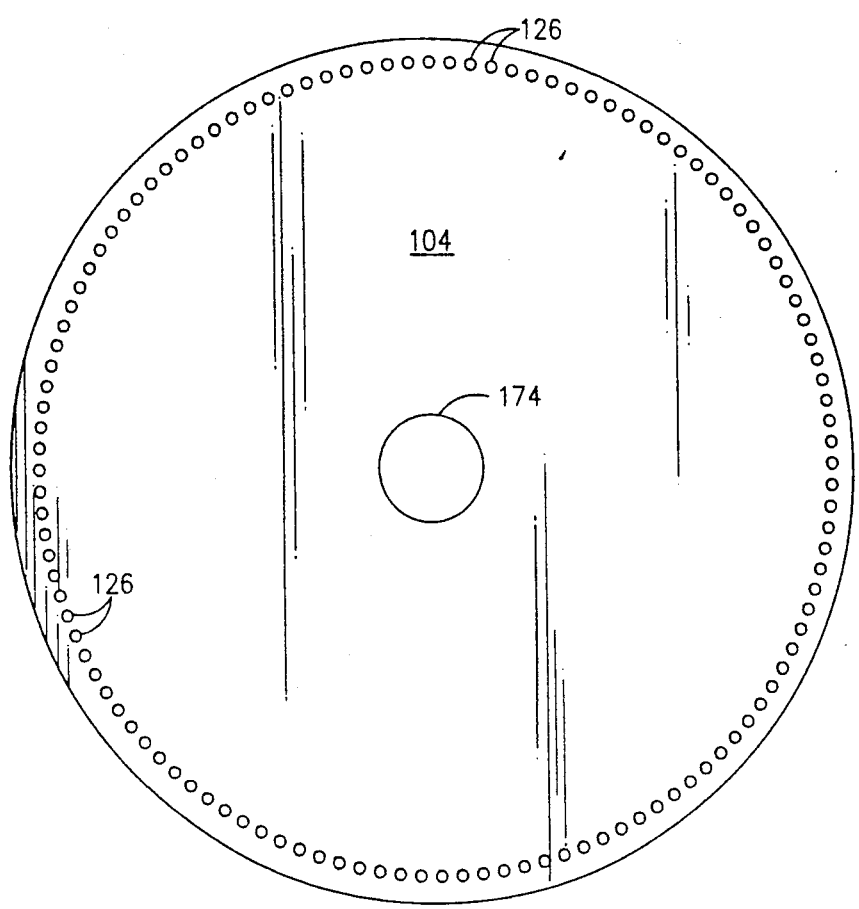
FIG. 5 is a side view of the die plate of the rotary press.
Figure 6:
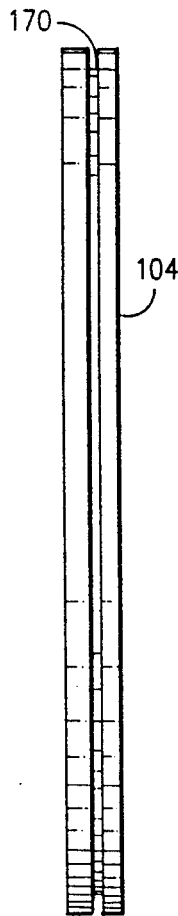
FIG. 6 is a front view of the die plate.
Figure 7:
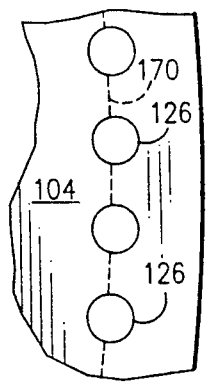
FIG. 7 is an enlarged view of a peripheral portion of the die plate.
Figure 8:
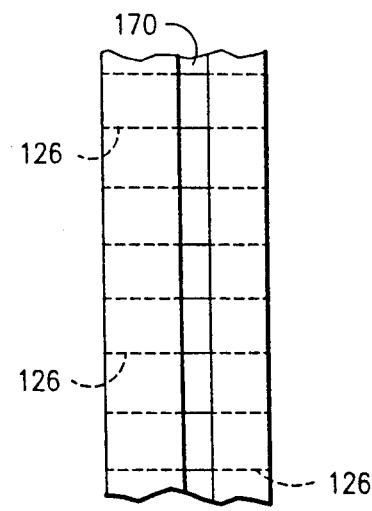
FIG. 8 is a front view of the portion of the die plate shown in FIG. 7.

With reference to FIGS. 1-4, rotary press 100, generally, comprises support frame 102, die plate 104, food supply means 110, first and second punch assemblies 112 and 114, first and second punch drive plates 116 and 120, and drive means 122, and preferably the rotary press further comprises food supply control means 124. The die plate is rotatably supported by the support frame and forms a multitude of die cavities (shown at 126 in FIG. 5), and the food supply means is provided to conduct a food material to those die cavities from a source of the food material. Punch assemblies 112 and 114 are rotatably supported by support frame 102 and are located on first and second sides, respectively, of the die plate. Each of the punch assemblies 112 and 114 includes a multitude of punches (shown at 130 and 132, respectively, in FIG. 11) that are supported for axial reciprocating movement and that are axially aligned with the die cavities 126 of the die plate.

First drive plate 116 is located adjacent the first punch assembly and engages the first punches, and second drive plate 120 is located adjacent the second punch assembly and engages the second punches. Drive means 122 is connected to the die plate and to the left and right punch assemblies to rotate these components of press 100. As the die plate and the first and second punch assemblies rotate, first drive plate 116 reciprocates the first punches, and second drive plate 120 reciprocates the second punches to force food material into die cavities 126, to mold or compress the food material therein into tablets and to eject the formed tablets from the die cavities Control means 124 may be used to control the rate at which the food material is conducted to die cavities 126 to help maintain constant the amount of food material forced into the die cavities.

More specifically, support frame 102 provides support for the other elements of press 100; and, generally, the support frame includes legs 150, motor support plate 152, upper support plate 154, lower cross braces 156, side plates 160 and 162, and upper cross plates 164. Legs 150 rest on the ground, floor or other suitable support surface for press 100 and extend upward therefrom. Motor support plate 152 is connected to and is supported by intermediate portions of legs 150 and horizontally extends between those legs, and plate 152 provides the support for motor 166, discussed in detail below. Upper support plate 154 is connected to and is supported by top ends of legs 150 and also horizontally extends between the legs; and plate 154 provides the desired support for the upper elements of press 100, such as die plate 104, left and right punch assemblies 112 and 114, drive plates 116 and 129 and feed means 110.

Left side plate 160 has a generally rectangular shape and is connected to and extends upward, substantially vertically from a left side of support plate 154. Similarly, right side plate 162 also has a generally rectangular shape and is connected to and extends upward, substantially, vertically, from a right side of plate 154. Lower cross braces 156 are connected to and extend between lower portions of legs 150 to brace and to help support those legs. An upper cross plate 164 is connected to and extends between upper forward portions of plates 160 and 162 to brace and support those plates, and a second upper cross plate (not shown) is connected to and extends between upper rearward portions of plates 160 and 162 to further brace and support those plates 160 and 162.

The various parts of support frame 102 may be made of any suitable material and connected together in any suitable manner. For example, legs 150 may be made of a metal and have a hollow, rectangular or square horizontal cross-section, and plates 160 and 162 may be a solid and also formed of a metal. Cross braces 156 and plate 154 may be welded to legs 150, plate 152 may be bolted to legs 150, plates 160 and 162 may be bolted to plate 154, and cross plates 164 may be bolted to side plates 160 and 162.

With reference to FIGS. 5-8, die plate 104 has a generally circular, flat shape and defines a multitude of axial through openings 126 and a peripheral annular groove 170. These axial through openings form the die cavities of the die plate and are uniformly spaced apart on a circle that itself is spaced slightly inward of the outer circumference of the die plate. Annular groove 170 is formed in the outer annular surface of the die plate, and this groove extends inwardly to a level that is radially inwardly of the radially outwardmost portion of die cavities 126, so that groove 170 is thus in communication with each of those die cavities. Preferably, groove 170 extends inward from the radially outwardmost portion of each of die cavities 126 for a distance equal to about two-thirds the diameter of the die cavity. Also, preferably, as viewed in FIGS. 1, 6 and 8, annular groove 170 is spaced slightly to the right of the centerline of die plate 104.

With reference again to FIGS. 1-4, the die plate is supported for rotation in a substantially vertical plane, and in particular, is mounted on, is supported by and vertically extends upward and downward from horizontal support shaft 172. More specifically, the die plate means forms a central opening 174, and support shaft 172 extends through this opening and the die plate is connected to the support shaft for unitary rotation therewith. For example, a disk (not shown) may be bolted to the support shaft and to the die plate to rotate that plate with the support shaft.

Support shaft 172 extends between and is rotatably supported by left and right side plates 160 and 162 of frame 102. Aligned openings are formed in these side plates, and thrust and radial bearing assemblies 176 and 180 are connected to these side plates in these through openings. Shaft 172 extends through these bearing assemblies 176 and 180, which support the shaft and allow the shaft to rotate while preventing or limiting axial movement of the shaft.

Figure 9:
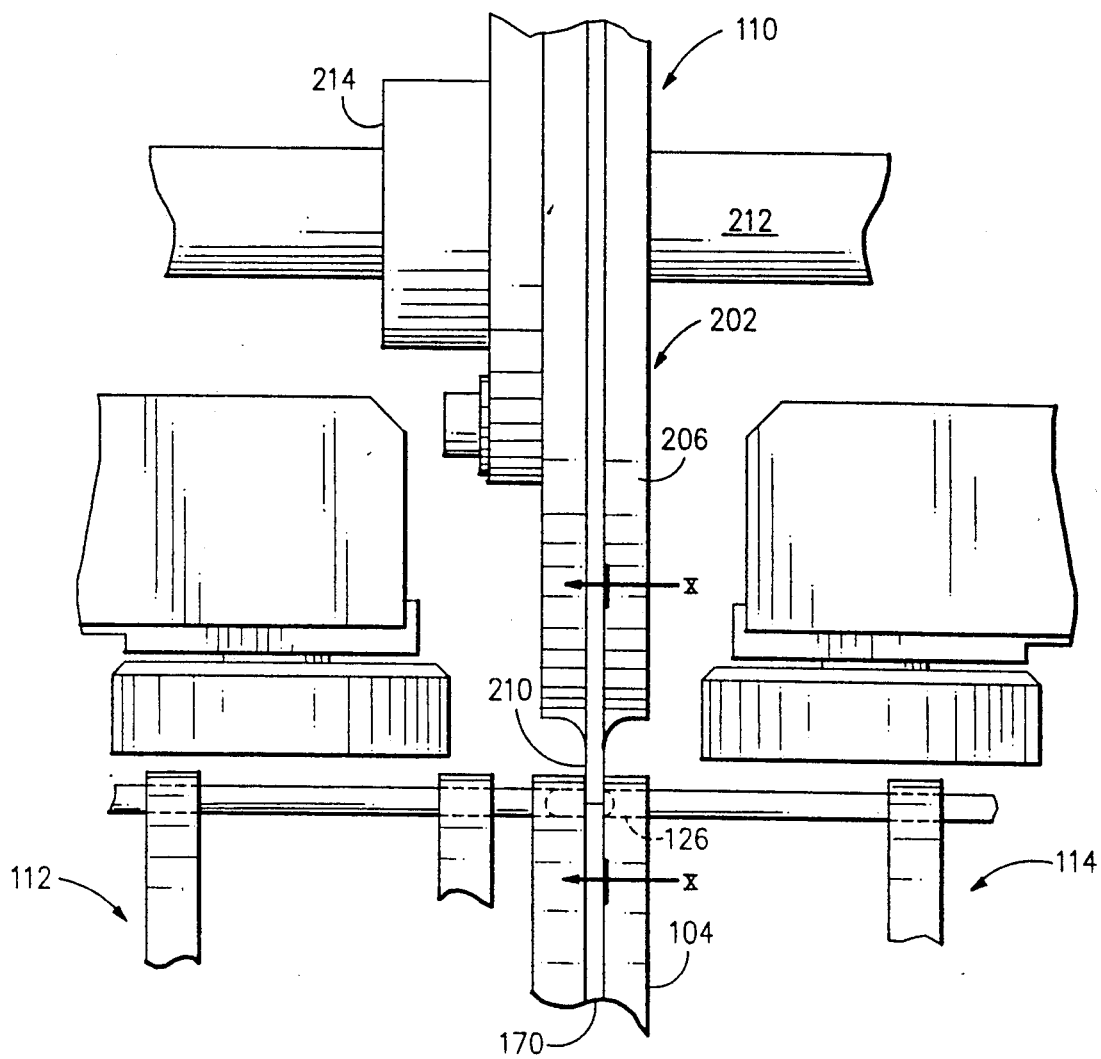
FIG. 9 is a front view particularly showing the food material supply means of the rotary press.
Figure 10:
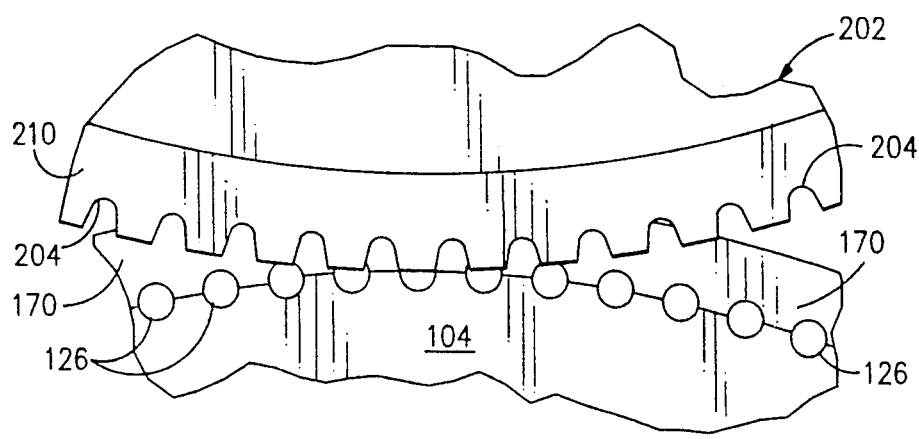
FIG. 10 is a side view of a portion of the food supply means, taken along line X—X of FIG. 9.

Food supply means 110 is shown in greater detail in FIGS. 9 and 10; and with reference thereto, the food supply means comprises supply wheel 202 rotatably supported by support frame 102 and extending into annular groove 170 of die plate 104. Any suitable means may be used to convey food material into annular groove 170 from a primary source of the food material, and wheel 202 guides and forces that food material into that groove. Preferably, with the embodiment of press 100 shown in the drawings, the food material is conveyed into groove 170 in the form of a continuous, elongated rope. Supply wheel 202 forms a multitude of peripheral notches 204 to help meter material from that rope and into individual die cavities 126 of the die plate; and in particular, to separate the elongated rope of material into a multitude of pieces or segments inside annular groove 170.

The embodiment of supply wheel 202 shown in FIGS. 9 and 10 is supported for rotation about an axis parallel to the axis of die plate 104, extends in the same plane as the die plate, and extends into groove 170 to a position closely adjacent the radially inward, or bottom, surface of that groove. Further, supply wheel 202 includes central portion 206 and peripheral flange portion 210, which forms notches 204 and extends into annular groove 170; and the supply wheel is mounted on, is supported by and vertically extends upwards and downwards from horizontal support shaft 212, directly above die plate 104.

More specifically, support shaft 212 extends through supply wheel 202, coaxial therewith, and the supply wheel is connected to this support shaft for unitary rotation therewith. For instance, a disk 214 may be bolted to support shaft 212 and to supply wheel 202 to rotate this wheel with the support shaft and to hold the wheel axially in place along the support shaft. Support shaft 212 itself extends between and is rotatably supported by left and right side plates 160 and 162 of frame 102. In particular, with reference to FIGS. 2 and 3, brackets 216 and 220 are connected to these side plates; and bearing assemblies 222 and 224 are, in turn, connected to these brackets. Shaft 212 extends through these bearing assemblies, which support the shaft and allow it to rotate while preventing or limiting axial movement of the support shaft.

Any suitable arrangement may be used to rotate food supply wheel 202; and, for instance, a separate electric motor may be connected to support shaft 212 to rotate that shaft and the food supply wheel. Preferably, though, as discussed in greater detail below, drive means 122 is also connected to the food supply wheel to rotate that wheel, as well as die plate 104 and punch assemblies 112 and 114. Regardless of the specific means used to rotate supply wheel 202, preferably that wheel is rotated at twice the rotational speed, but in the opposite angular direction, as the die plate. In this way, at the closest approach of supply wheel 202 to the die plate, the wheel and the die plate move in the same linear speed and direction. Moreover, preferably the number of notches 204 on supply wheel 202 is equal to the number of die cavities 126 in the die plate; and as the food supply wheel and the die plate rotate, each notch 204 passes through annular groove 170, and each notch passes, in a circumferential direction, between a pair of adjacent die cavities.

Figure 11:
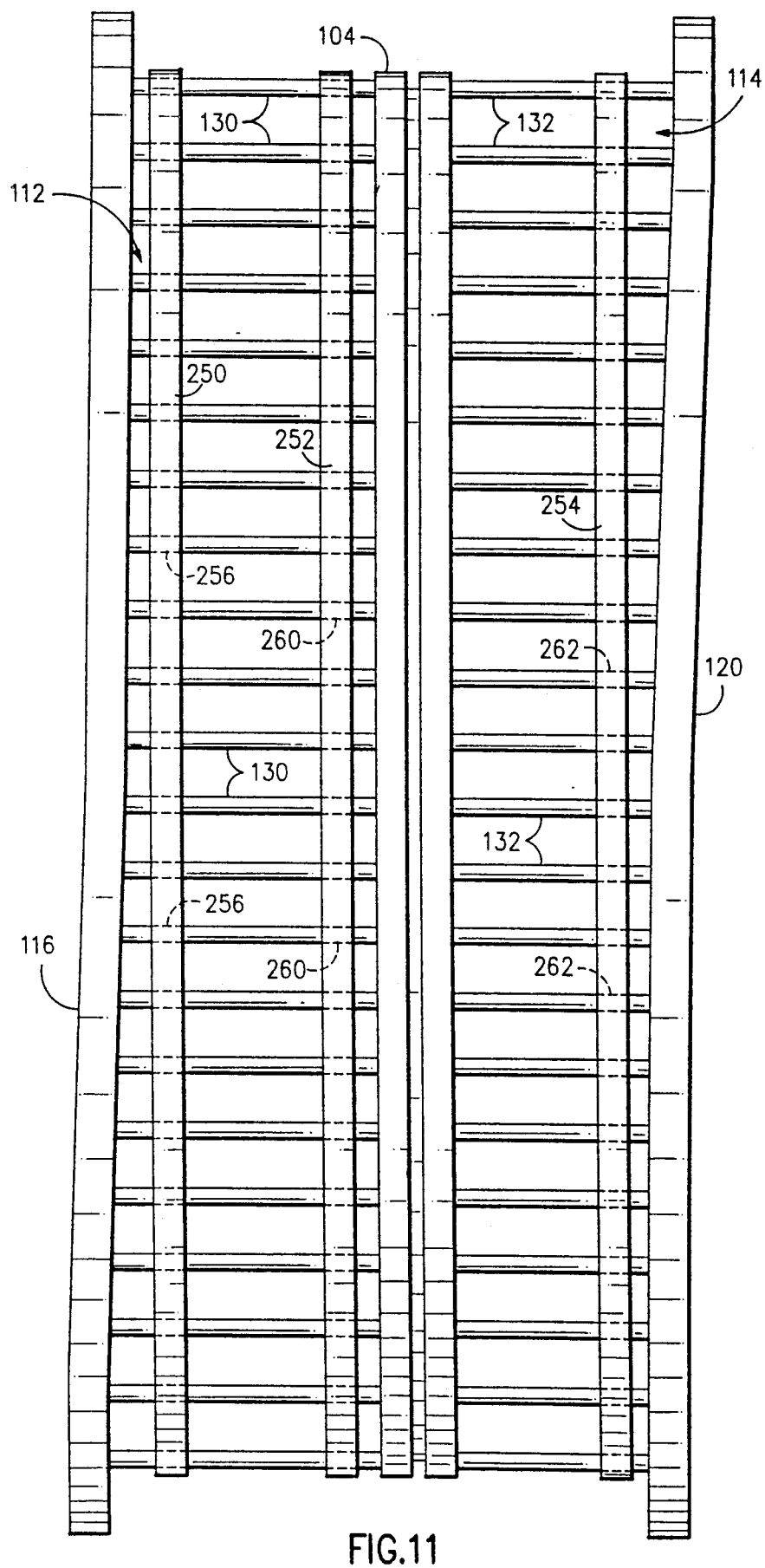
FIG. 11 is a front view of the punch assemblies of the rotary press shown in FIGS. 1-3.

FIG. 11 shows punch assemblies 112 and 114 in greater detail. As previously mentioned, assembly 112 is located on a first side, specifically the left side, of die plate 104 and includes a multitude of first punches 130; and each of these first punches is aligned with and is supported for axial reciprocating movement in a respective one of the die cavities 126 of the die plate. Punch assembly 114 is located on a second side, specifically the right side, of die plate 104 and includes a multitude of second punches 132; and each of these second punches is also aligned with and is supported for axial reciprocating movement in a respective one of the die cavities of the die plate. Preferably, the number of first punches 130 and the number of second punches 132 are both equal to the number of die cavities 126 in the die plate; however, for the sake of clarity, not all of these first and second punches are shown in FIG. 11.

With the embodiments of punch assemblies 112 and 114 shown in the drawings, the former punch assembly also includes first and second support plates 250 and 252 to support first punches 130 for rotary and axial movement, and punch assembly 114 further includes third support plate 254 to support second punches 132 for rotary and axial movement. The punch support plates 250, 252 and 254 are substantially identical to each other, and a side view of plate 250 is shown in FIG. 12.

Figure 12:
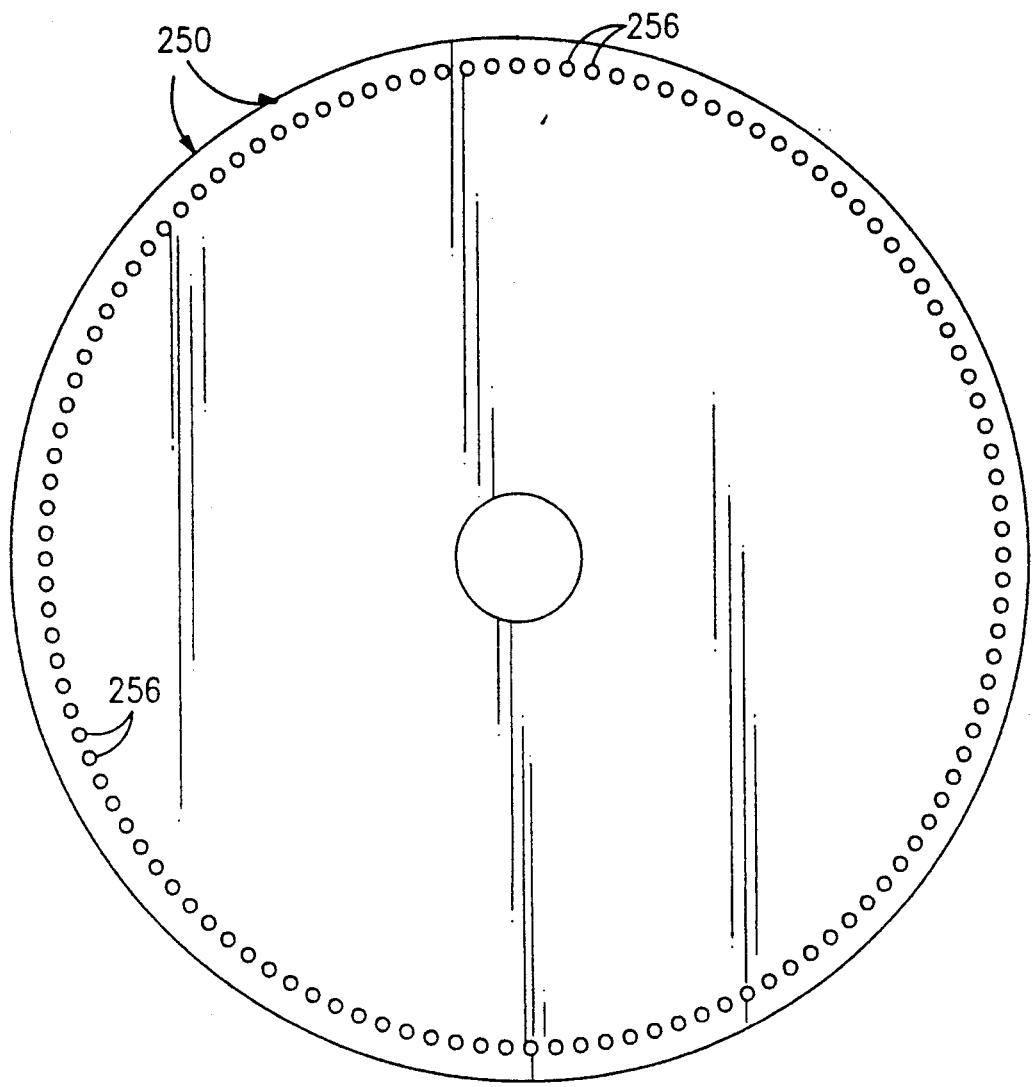
FIG. 12 shows one of the punch support plates of the rotary press.

With reference to FIGS. 11 and 12, each of the punch support plates has a generally flat, circular shape, and is rotatably mounted on support shaft 172. Also, each of the punch support plates is connected to die plate 104 for rotation therewith, and vertically extends substantially parallel to the die plate. Support plate 252 is slightly spaced from and located to the left of die plate 104, support plate 250 is spaced to the left of plate 252, and support plate 254 is spaced from and located to the right of the die plate.

Each of the punch support plates defines a multitude of axial support openings extending through the plate and uniformly spaced apart on a circle that is coaxial with and has the same diameter as the circle formed by die cavities 126 of the die plate. These through openings of plate 250 are referenced at 256 in FIGS. 11 and 12; and these through openings of plates 252 and 254 are referenced at 260 and 262, respectively, in FIG. 11. Moreover, the number of these through openings in each of the punch support plates is the same as the number of die cavities in the die plate; and in assembly in press 100, each die cavity of the die plate is axially aligned with a respective one support opening 256 in the support plate 250, with a respective one support opening 260 in plate 252 and with a respective one support opening 262 in plate 254.

Each first punch 130 extends through a respective one support opening 256 in support plate 250 and through the aligned support opening 260 in support plate 252, and these plates support the punch for axial reciprocating movement in these openings and in the die cavity aligned with those openings. Likewise, each second punch 132 extends through a respective one support opening 262 in support plate 254, and this plate supports the punch for axial reciprocating movement in this opening and in the aligned die cavity. As discussed in greater detail below, each first punch 130 also engages first drive plate 116, and each second punch 132 engages second drive plate 120; and as the first and second punch assemblies rotate, these drive plates cause the first and second punches to reciprocate axially in desired patterns.

Figure 13:
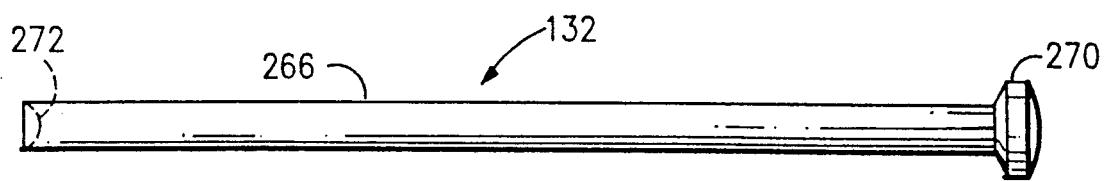
FIG. 13 shows a punch used in the rotary press

All of the first, or left, and second, or right, punches 130 and 132 are substantially identical to each other. FIG. 13 shows one of the punches 132 in detail; and with reference to this Figure, each of the punches comprises an elongated stem 266 and a head 270. The stem has a thin, solid cylindrical shape and forms a recess 272 at a first axial end. The punch head also has a generally solid cylindrical shape, has a diameter larger than the diameter of the punch stem and is connected to a second axial end of the stem, coaxial therewith. As illustrated in FIG. 13, a top surface of the punch head has a slightly convex shape. The head of each punch may be connected to the stem of the punch in any suitable manner, although preferably they are integrally connected together, so that the stem and the punch form a one piece, integral element.

As previously mentioned, punch support plates 250, 252 and 254 are connected to die plate 104 for unitary rotation therewith. This connection may be achieved by means of the left and right punches 130 and 132. To elaborate, the rotation of the die plate 104 may be used to rotate those punches around shaft 172, and this rotation of the punches may be used to rotate plates 250, 252 and 254 around shaft 172. Alternately, one or more of the punch support plates may be connected to die plate 104, independent of the first and second punches 130 and 132, to rotate the punch support plates with the die plate. As a still further alternative, support plates 250, 252 and 254 may be connected to the support shaft 172, just as the die plate is connected to this support shaft, so that rotation of the support shaft 172 causes the punch support plates to rotate, and rotation of these plates 250, 252 and 254 carries the punches 130 and 132 around the support shaft unitarily with the die plate.

First, or left, drive plate 116 engages first punches 130 and second, or right, drive plate 120 engages second punches 130 so that as the first and second punch assemblies rotate, the first drive plate reciprocates the first punches through a first cyclical pattern and the second drive plate reciprocates the second punches through a second cyclical pattern, and these punches cooperate to force food material into die cavities 126 from annular groove 170, to compress the food material into tablets in those die cavities, and then to eject the formed tablets from the die cavities. With the embodiment of press 100 illustrated in the drawings, this reciprocating motion of punches 130 and 132 is achieved by, first, holding drive plates 116 and 120 so that the axial distance between plates 104 and 116 and the axial distance between plates 104 and 120 varies along the circumference of the die plate, and second, connecting the left and right punches to the left and right drive plates, respectively, so that as the punches rotate about shaft 172, each punch moves axially as the distance, along that punch, between the die plate and the drive plate to which the punch is connected, changes.

More specifically, preferably drive plates 116 and 120 are supported in press 100 for rotation about shaft 172; and as each drive plate rotates, the drive plate rotates through a generally flat but non-planar area that extends at a small angle to the plane of the plate 104. With this arrangement, as left drive plate 116 rotates about shaft 172, any specific small area on the peripheral portion of the drive plate also moves axially. For instance, as the left drive plate makes one complete revolution, a small area that is at the top of the drive plate at the start of that revolution, first moves axially away from die plate 104, reaches a maximum distance therefrom, then moves axially toward the die plate and reaches a minimum distance therefrom. Each left punch 130 is connected to the left drive plate so that as the specific area of the drive plate to which that punch is connected, moves axially, either toward or away from the die plate, that punch moves axially with that area of the left drive plate.

Analogously, as right drive plate 120 rotates about shaft 172, any specific small area on the peripheral portion of the drive plate also moves axially. For example, as this drive plate makes one complete revolution, a small area that is at the top of the drive plate at the start of that revolution, first moves axially toward die plate 104, reaches a minimum distance therefrom, then moves axially away from the die plate, reaches a maximum distance therefrom, and then again moves axially toward the die plate. Each right punch 132 is connected to the right drive plate so that as the specific area of the drive plate to which that punch is connected, moves axially, that punch moves axially with that area of the right drive plate.

Each right punch 132 is aligned with a respective one associated die cavity 126; and the right drive plate is oriented and the length of the right punches is chosen so that each right punch extends into the associated, aligned die cavity of the die plate during the entire period over which the punch makes one complete revolution about shaft 172. Each left punch 130 is aligned with a respective one associated die cavity 126 in die plate 104; and the left drive plate is oriented and the length of the left punches is chosen so that each left punch extends into the associated die cavity for about four fifths of the period over which the punch makes one complete revolution about shaft 172.

Any suitable arrangement or means may be used to connect the left and right punches to the left and right drive plates, respectively, to move those punches with those plates in the above-described manner, and several such arrangements are discussed below in detail.

Figure 14A:
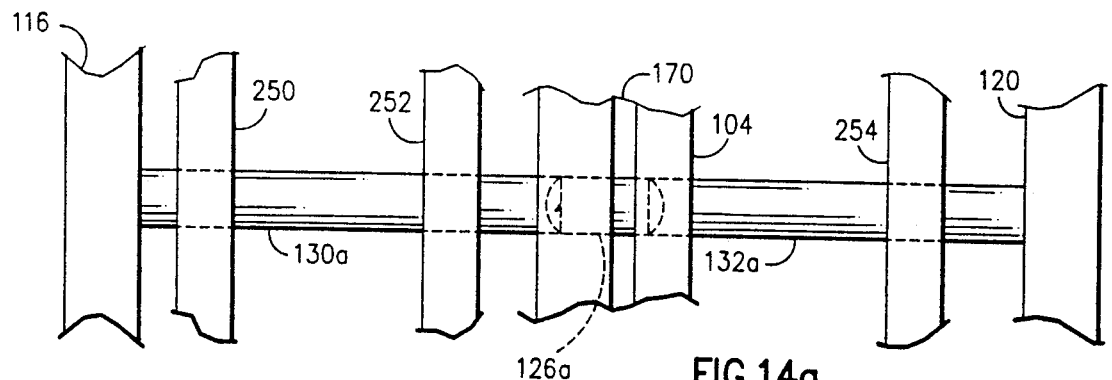
FIG. 14e is a view of a tablet made in the rotary press.
Figure 14B:
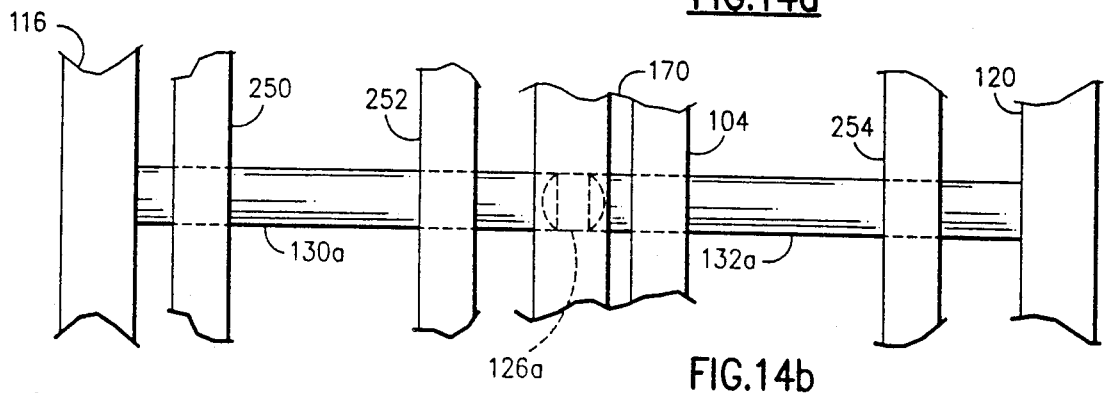
Figure 14C:
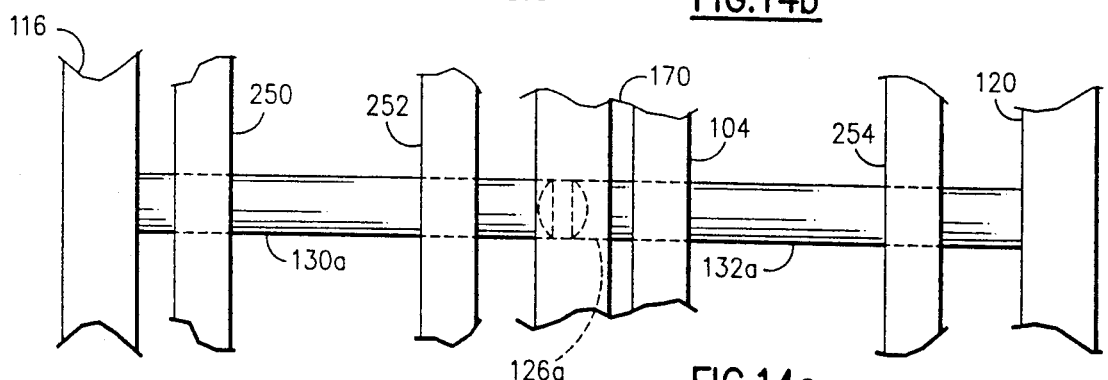
Figure 14D:
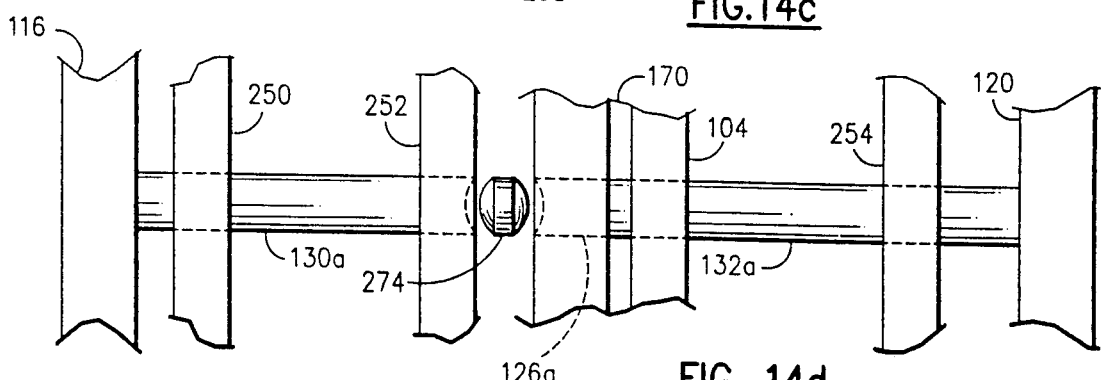
Figure 14E:
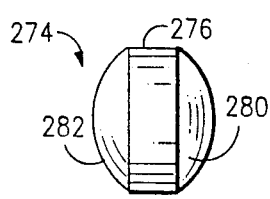

The preferred cycle of the axial movement of the left and right punches 130 and 132 may be best understood with reference to FIGS. 1, 2 and 14a-d. FIGS. 14a-d show one particular left punch, referenced at 130a, at various positions as it makes one complete revolution about shaft 172; and these Figures show one particular right punch, referenced at 132a, at various positions during one complete revolution around shaft 172. FIGS. 14a-d also show one specific die cavity, referenced at 126a, that is axially aligned with the shown punches 130a and 132a. More specifically, FIG. 14a shows the punches 130a and 132a when they are immediately below the top of the vertical centerline of die plate 104; and FIG. 14b shows these punches after they have rotated 60°, in the clockwise direction in the view of FIG. 2, from the top of the vertical centerline of the die plate FIG. 14c shows punches 130a and 132a at a position 120° in the clockwise direction, in the view of FIG. 2, along the circumference of the die plate from the top of the vertical centerline thereof; and FIG. 14d shows the punches after they have rotated 220°, in the clockwise direction in the view of FIG. 2, from the top of the vertical centerline of the die plate.

When punch 132a is at the top of the circle it traverses as it rotates around shaft 172, the punch is in its rightwardmost position as viewed from the front of the press 100; and in this position, the punch extends into the aligned die cavity 126a, with the left end of the punch slightly to the right of groove 170. As punch 132a rotates around shaft 172, the punch moves to the left, as viewed from the front of press 100, across groove 170 and to the position shown in FIG. 14b. As the punch continues to rotate around shaft 172, the punch continues to move to the left, to the position shown in FIG. 14c and then to the position shown in FIG. 14d. In the latter position, the left end of punch 132a is immediately adjacent the left end of cavity 126a. As the punch continues to rotate, the punch then moves to the right, from the position shown in FIG. 14d and back to the position shown in FIG. 14a.

This cycle of the right punch is repeated each time the punch makes one complete revolution about shaft 172; and, furthermore, each of the right punches moves through an identical cycle as that punch rotates around the shaft 172.

When punch 130a is at the top of the circle it traverses as it rotates around shaft 172, the punch extends into the aligned die cavity 126a, as shown in FIG. 14a. In particularly, in this position, the right end of punch 130a is between groove 170 and the left end of the die cavity. As the punch rotates about shaft 172, the axial position of the punch remains substantially constant until the punch has rotated approximately 120° in the clockwise direction in the view of FIG. 2, around shaft 172. As punch 130a rotates further, the punch moves axially to the left, from the position shown in FIG. 14c. The punch moves out of the die cavity 126a, and completely across the gap between die plate and upport plate 252, to the position shown in FIG. 14d. As punch 130a rotates still further about shaft 172, the punch now moves axially to the right, back into the aligned die cavity 126a and back to the position shown in FIG. 14a.

This cycle of the left punch is repeated each time the punch makes one complete revolution about shaft 172. Moreover, each of the left punches moves through an identical cycle as that punch rotates around the shaft.

As punch 132a moves from the position shown in FIG. 14a to the position shown in FIG. 14b, the punch forces food material into the die cavity 126a from the groove 170; and as the punch moves from this position to the position shown in FIG. 14c, the punch forces that food material against the opposite punch 130a to form that food material into a tablet. As punches 132a and 130a move from the positions shown in FIG. 14c to the positions shown in FIG. 14d, the former punch pushes the formed tablet, referenced at 274, out of the die cavity, into the gap between die plate 104 and support plate 252; and the tablet then falls down under the force of gravity, between plates 104 and 252, and is discharged from press 100. High velocity air may be conducted past the die plate to help force the formed tablets downward.

The formed tablet has a cylindrically shaped central portion 276 and first and second end portions 280 and 282. The size and shape of central portion 276 is determined by the cross-sectional size and shape of the die cavities and by the minimum distance between the aligned left and right punches. The size and shape of the tablet end portions are determined by, and in fact match, the size and shape of recesses 272 in the ends of the punches.

Figures 19, 20:
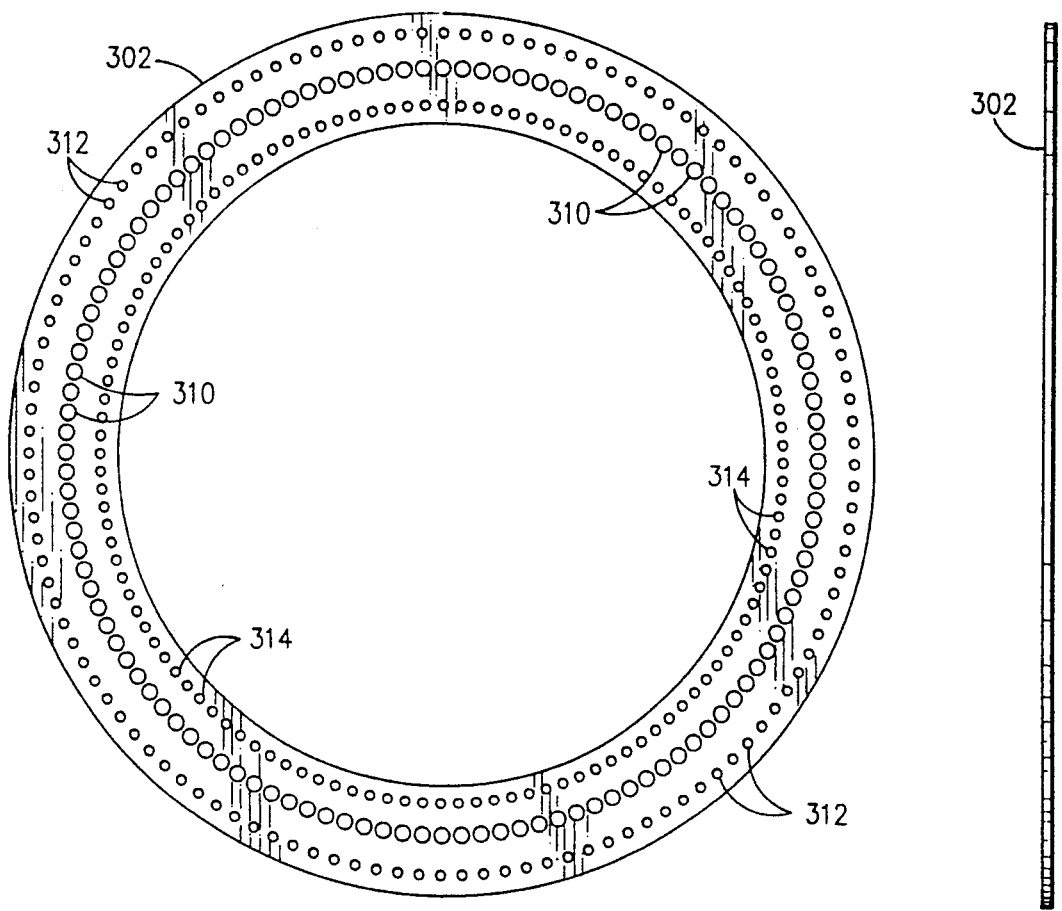
FIG. 19 is a side view of the base ring of the drive plate shown in FIG. 17.
FIG. 20 is a front view of the base ring.

Preferably, left and right drive plates 116 and 120 are substantially identical, and thus only the right drive plate will be described herein in detail. With reference to FIGS. 15-18, drive plate 120 includes base ring 302, and connecting assembly 304; and this connecting assembly, in turn, includes a multitude of connecting subassemblies 306. In press 100, base ring 302 extends around and is supported for rotation around shaft 172. Connecting assembly 304 is provided to connect right punches 132 to base ring 302 for axial and rotary movement therewith; and in particular, each of the subassemblies 306 connects a respective one right punch 132 to the base ring for axial and rotary movement with that base ring. Base ring 302 itself is shown in FIGS. 19 and 20; and as shown therein, the base ring has a flat, ring shape and forms a multitude of through openings 310 uniformly spaced apart on a circle adjacent and concentric with the outside circumference of the base plate. In assembly, the head of a respective one punch 132 is held in each of these through openings 310 by a respective one subassembly 306 that is itself releasably connected to base ring 302.

The embodiment of base ring 302 shown in FIGS. 19 and 20 also forms a multitude of outer through openings 312 and a multitude of inner through openings 314. Outer openings 312 are uniformly spaced apart on a circle concentric with and radially outside of the circle formed by openings 310, and each outer through opening is radially aligned with a respective one through opening 310. Analogously, inner through openings 314 are uniformly spaced apart on a circle concentric with and radially inside the circle formed by openings 310, and each inner through opening 314 is radially aligned with a respective one through opening 310. Base ring 302 is at least slightly flexible, so that, in press 100, portions of the ring can flex toward and away from the die plate. Base ring 302 may be made of many types of materials such as polypropylene.

Connecting subassemblies 306 are also substantially identical to each other, and one of these subassemblies is shown in greater detail in FIGS. 21a–c, 22a–c and 23. Subassembly 306 comprises top and bottom retainer members 316 and 320. Each of these retainer members has a generally rectangular shape, however, the longitudinal sides of the retainer members are not parallel, but extend at a small angle to each other such that when these members are mounted on base ring 302, the longitudinal sides of the retainer members extend along radii of the base ring. Top retainer member 316 includes inward and outward through openings 322 and 324, and bottom retainer member 320 forms inward, outward and central through openings 326, 330 and 332. The surfaces forming openings 326 and 330 are threaded. With particular reference to FIG. 23, openings 322 and 324 are positioned so that member 316 may be placed against base ring 302 with opening 322 aligned with one of the outer openings 312 of the base ring, and with opening 324 aligned with one of the inner openings 314 of the base ring. Similarly, openings 326, 330 and 332 are positioned so that member 320 may be placed against base ring 302 with opening 330 aligned with one of the inner openings 314 of the base ring, with opening 326 aligned with one of the outer openings 312 of the base ring, and with opening 332 aligned with the through opening 310 between those outer and inner through openings 312 and 314.

To connect a punch 132 to base ring 302, bottom retainer member 320 is held against a surface of the base ring, with openings 326 and 330 aligned with openings 312 and 314, respectively. A punch 132, specifically the shaft thereof, is inserted through the aligned openings 310 and 332, and the head of the punch is positioned inside opening 310 of base ring 302. Top retainer member 316 is positioned against an opposing surface of the base ring, over shaft head 270, and with openings 322 and 324 aligned with openings 312 and 314, respectively. Then, screws (not shown) are inserted through openings 322 and 324 and into openings 326 and 330 and threaded into secure engagement with bottom retainer 320, securely clamping both retainer members 316 and 320 to base ring 302, with the head of punch 132 captured inside opening 310.

With particular reference to FIG. 23, preferably the sides of opening 332 are convex, allowing the punch 132 to tilt slightly relative to base member 302.

Figure 24:
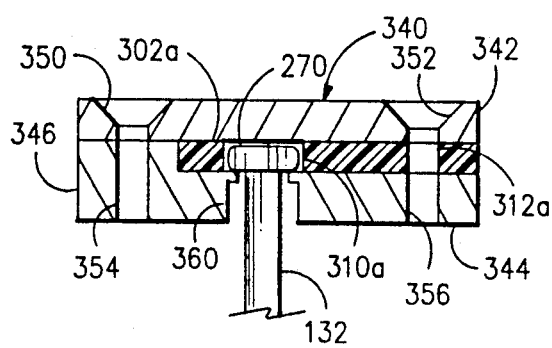
FIGS. 24 and 25 show an alternate connecting subassembly for connecting a punch to a base ring.
Figure 25:
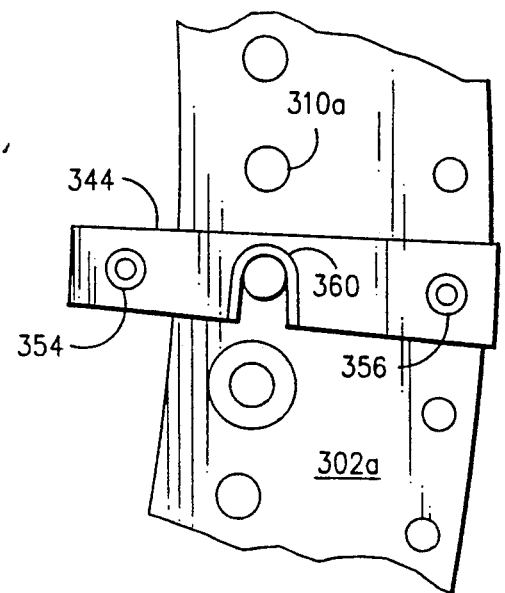

FIGS. 24 and 25 illustrate an alternate connecting subassembly 340 that may be used in the present invention. These Figures also show an alternate base ring member 302a, which is slightly different than ring member 302. In particular, ring member 302a includes a series of first openings (one of which is shown at 310a) that are similar to openings 310 of ring member 302, and a series of second openings (one of which is shown at 312a) that are similar to openings 312 of ring member 302. However, ring member 302a does not include any openings corresponding to openings 314 of ring member 302.

Connecting subassembly 340 also includes separable top and bottom retainer members 342 and 344, each of which has a generally rectangular shape, although one end of the bottom retainer member includes an upwardly extending flange portion 346. Retainer member 342 forms inward and outward openings 350 and 352, and bottom member forms inward, outward and central opening 354, 356 and 360. The surfaces forming openings 354 and 356 are threaded; and, as particularly shown in FIG. 25, opening 360 extends inward from a longitudinal side of retainer member 344. Openings 350, 352, 354, 356 and 360 are spaced such that members 342 and 344 may be placed against opposite sides of ring 302a, with openings 352 and 354 aligned with one of the outer openings 312a of the base ring, with openings 352 and 356 aligned with each other, and with opening 360 aligned with the opening 310a of the base ring.

To use a subassembly 340 to connect a punch 132 to base ring 302a, bottom retainer member 342 is held against a surface of the base ring, with openings 356 and 360 aligned with openings 310a and 312a, respectively. A punch, specifically the shaft thereof, is inserted through the aligned openings 310a and 360, and the head of the shaft is positioned inside opening 310a of the base ring. Top retainer member is positioned against an opposing surface of the base ring, over the punch head 270, and with openings 350 and 352 aligned with openings 354 and 356, respectively. Then, screws (not shown) are inserted through openings 350 and 352 and into openings 354 and 356 and threaded into secure engagement with bottom retainer member 344, securely clamping both retainer members 342 and 344 to the base ring 302a, with the head of the punch captured inside opening 310a.

Figure 26:
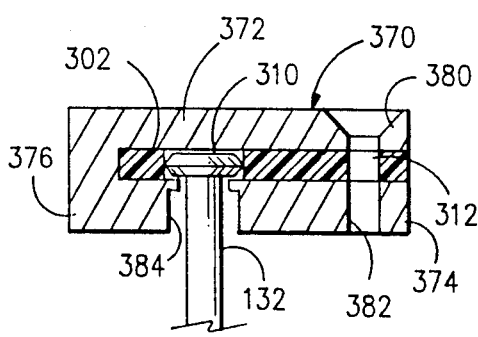
FIGS. 26 and 27 illustrate a further connecting subassembly that may be used to connect a punch to a base ring.
Figure 27:
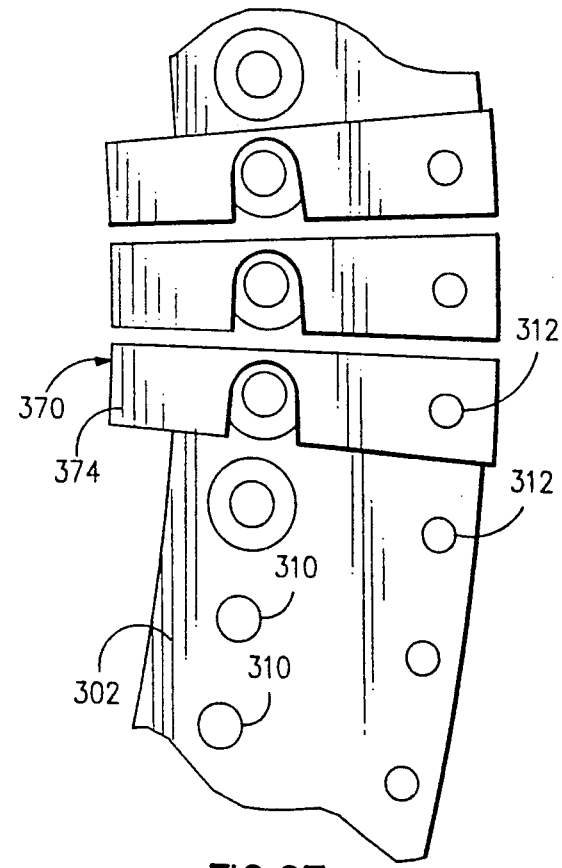

FIGS. 26 and 27 illustrate a one piece connecting subassembly 370 that also may be used to secure punches 132 to base ring 302a. Subassembly 370 has a u-shape, and includes top leg 372, bottom leg 374 and connecting leg 376. Legs 372 and 374 are substantially parallel to each other, and leg 376 extends between ends of legs 372 and 374, connecting those legs together. Legs 372 and 374 define aligned openings 380 and 382, and leg 374 also defines opening 384. The surfaces forming openings 382 are threaded, and, as particularly shown in FIG. 27, opening 384 extends inward from a longitudinal side of leg 374. Openings 380, 382 and 384 are positioned such that subassembly 370 may be mounted on base ring 302, with openings 380 and 382 aligned with opening 312 of the base ring, and with opening 384 aligned with opening 310.

To use subassembly 370 to connect a punch 132 to base ring 302a, a punch head is positioned inside opening 310a of the base ring, with the punch shaft extending outward therefrom. Subassembly 370 is then slid onto the base ring 302a so that the punch shaft is slid into opening 384 of lower leg 374, upper leg 372 is slid over the punch head, and openings 380 and 382 are both aligned with opening 312a of the base ring. Then, a screw (not shown) is inserted through openings 380 and 312a and into opening 382 and threaded into secure engagement with bottom leg 374, securely clamping the connecting subassembly 370 to the base ring 302a, with the head of punch 132 captured inside opening 310a.

With subassemblies 340 and 370, it is not necessary to provide the base ring with inner openings 314. Moreover, with all of the above-described connecting subassemblies, although the punch head is securely captured in ring opening 310 or 310a, preferably some movement of the punch head and the punch shaft is permitted, allowing the axis of the punch to pivot or tilt slightly.

As shown in FIGS. 15 and 16, drive plate 120 has a thin, planar shape. As previously mentioned, in press 100, the drive plates 116 and 120 are held in generally flat but non-planar positions; and deviations of the drive plates from precisely planar shapes are used, along with the slanted orientation of the drive plates, to move punches 130 and 132 in the desired manner. Moreover, the area or volume through which each drive plate rotates, although being non-planar, remains substantially constant. Press 100 includes left and right support assemblies 402 and 404 to hold drive plates 116 and 120, respectively, in the desired shapes in press 100 while also allowing these plates to rotate about shaft 172. Moreover, preferably these support assemblies also allow the drive plates, or at least portions thereof, to flex axially slightly during operation of the press. Support assembly 402 comprises a multitude of separate subassemblies that are spaced around and engage a peripheral portion of plate 116; and likewise, support assembly 404 comprises a multitude of individual subassemblies that are spaced around and engage a peripheral portion of plate 120. Two of these subassemblies are referenced at 410 in FIG. 1. The subassembly 410 on the left side of the die plate is part of left support assembly 402, and the subassembly 410 on the right side of the die plate is part of right support assembly 404.

Figure 28:
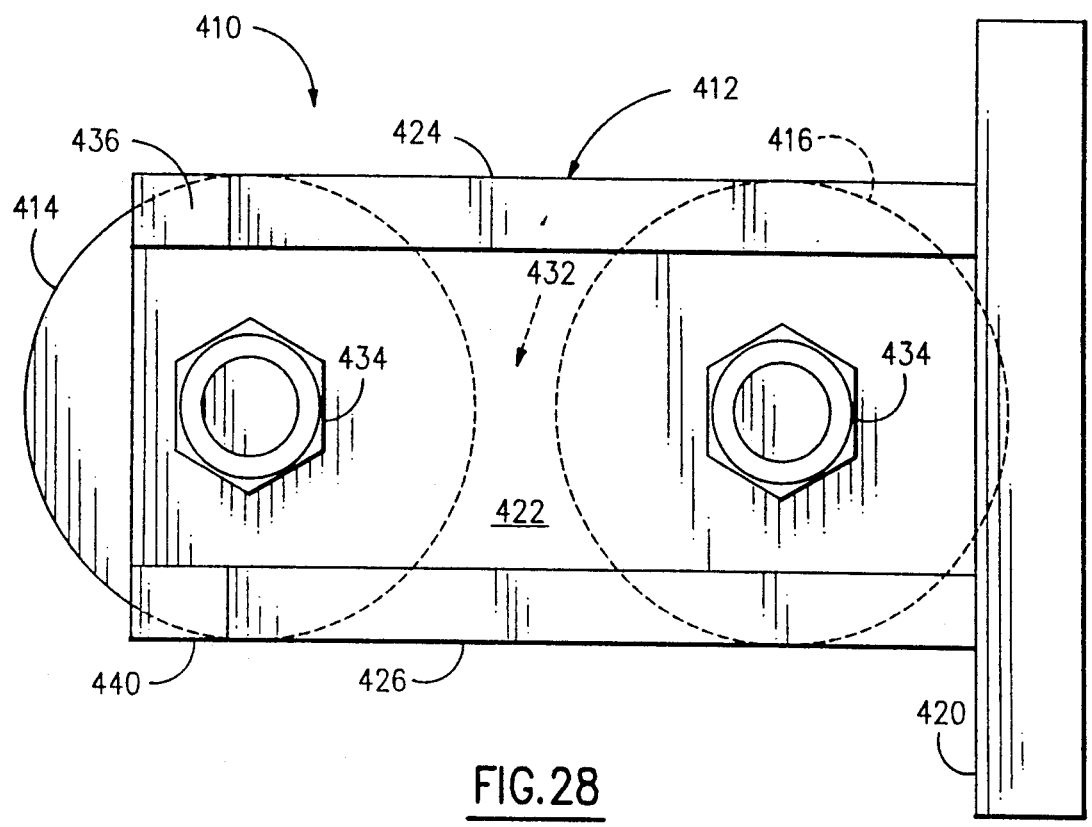
FIG. 28 is a front view of a support subassembly for the punch drive plates used in the rotary press.
Figure 29:
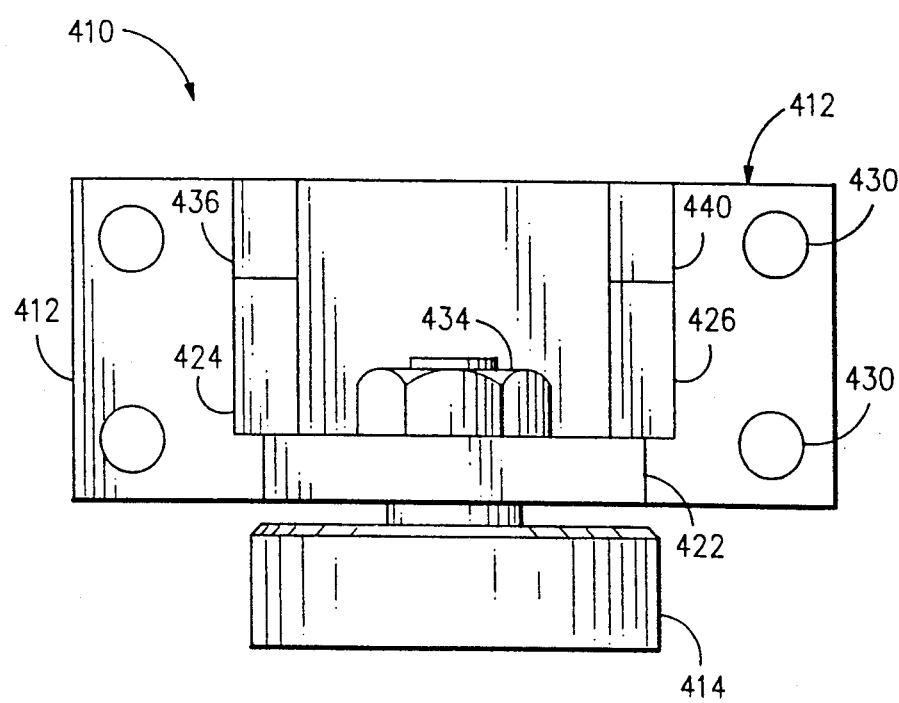
FIG. 29 is a side view of the support subassembly of FIG. 28.

The individual subassemblies of support assemblies 402 and 404 are substantially identical to each other, and thus only one of these subassemblies will be described herein in detail. Subassembly 410 is shown in greater detail in FIGS. 28 and 29; and with reference thereto, this subassembly includes bracket 412 and first and second rollers 414 and 416, and this bracket, in turn, includes connecting plate 420, base plate 422 and lateral plates 424 and 426.

Connecting plate 420 is provided to connect subassembly 410, specifically bracket 412 thereof, to support frame 102, specifially either left or right side frame members 160 or 162 thereof. This may be done in any suitable way; and, for example, plate 420 may have a plurality of through openings 430, and bolts (not shown) may be inserted through those openings and used to connect plate 420 to one of the side frame members of press 100. Plate 422 is connected to plate 420 and extends outward therefrom, substantially perpendicular thereto. Both plates 420 and 422 have a rectangular shape, and the transverse axis of plate 422 is also substantially parallel to the longitudinal axis of plate 420.

Rollers 414 and 416 are rotatably connected to bracket 412, specifically plate 422 thereof. More particularly, rollers 414 and 416 are positioned on a first side of plate 422 and are connected thereto for rotation about first and second axes respectively. These axes are parallel to each other, and extend perpendicular to plate 422, centrally between the longitudinal edges of the plate 422. Roller 414 is disposed outward of roller 416, and the circumferential edges of these two rollers are slightly spaced apart, forming gap 432 therebetween. Rollers 414 and 416 may be connected to plate 422 in any suitable manner, for example, via connecting bolts 434.

Plates 424 and 426 are also connected to plate 420 and extend outward therefrom, substantially perpendicular thereto. In addition, plates 424 and 426 respectively extend over first and second longitudinal edges of plate 422 and are connected thereto to help support that plate and rollers 414 and 416. Plates 424 and 426 have generally rectangular shapes, and the transverse axes of these plates are substantially parallel to the transverse axis of plate 420. Each of plates 424 and 426 has a truncated, outward edge referenced at 436 and 440 respectively.

The various plates of bracket 412 may be connected together in any suitable manner, such as by welding.

Figure 30:
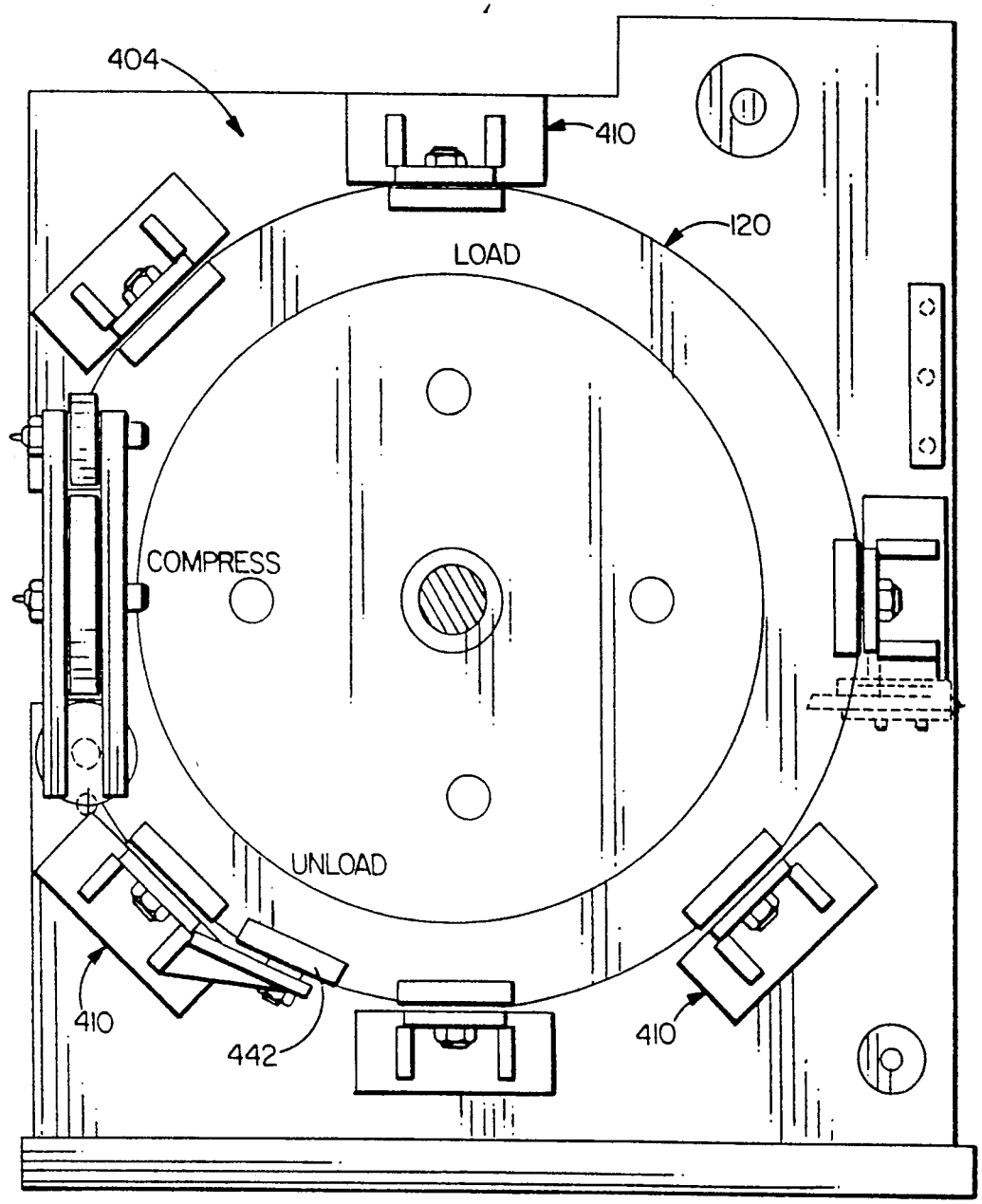
FIG. 30 illustrates how a multitude of support subassemblies are used to hold a punch drive plate in the rotary press.

Support assemblies 402 and 404 may include any suitable number of subassemblies 410, and these subassemblies may be spaced around the periphery of drive plates 116 and 120 in any suitable pattern or arrangement. For example, with reference to FIG. 30, assembly 404 may include six subassemblies 410. One of these subassemblies may be located at the top of the vertical centerline of drive plate 120; and the other five may be located, respectively, at 45°, 135°, 180°, 225°and 270° along the circumference of the drive plate, in the counterclockwise direction as viewed in FIG. 30, from the top of the drive plate. Also, a pair of additional, rotatable rollers (one of which is shown at 442 in FIG. 30) may be connected to one of the subassemblies 410 of assembly 404 and engage opposite sides of drive plate 120 to help hold the lower portion of the drive plate in the desired position. A similar pair of rollers may be used in assembly 402 to help hold drive plate 116 in its desired position.

Figure 1:
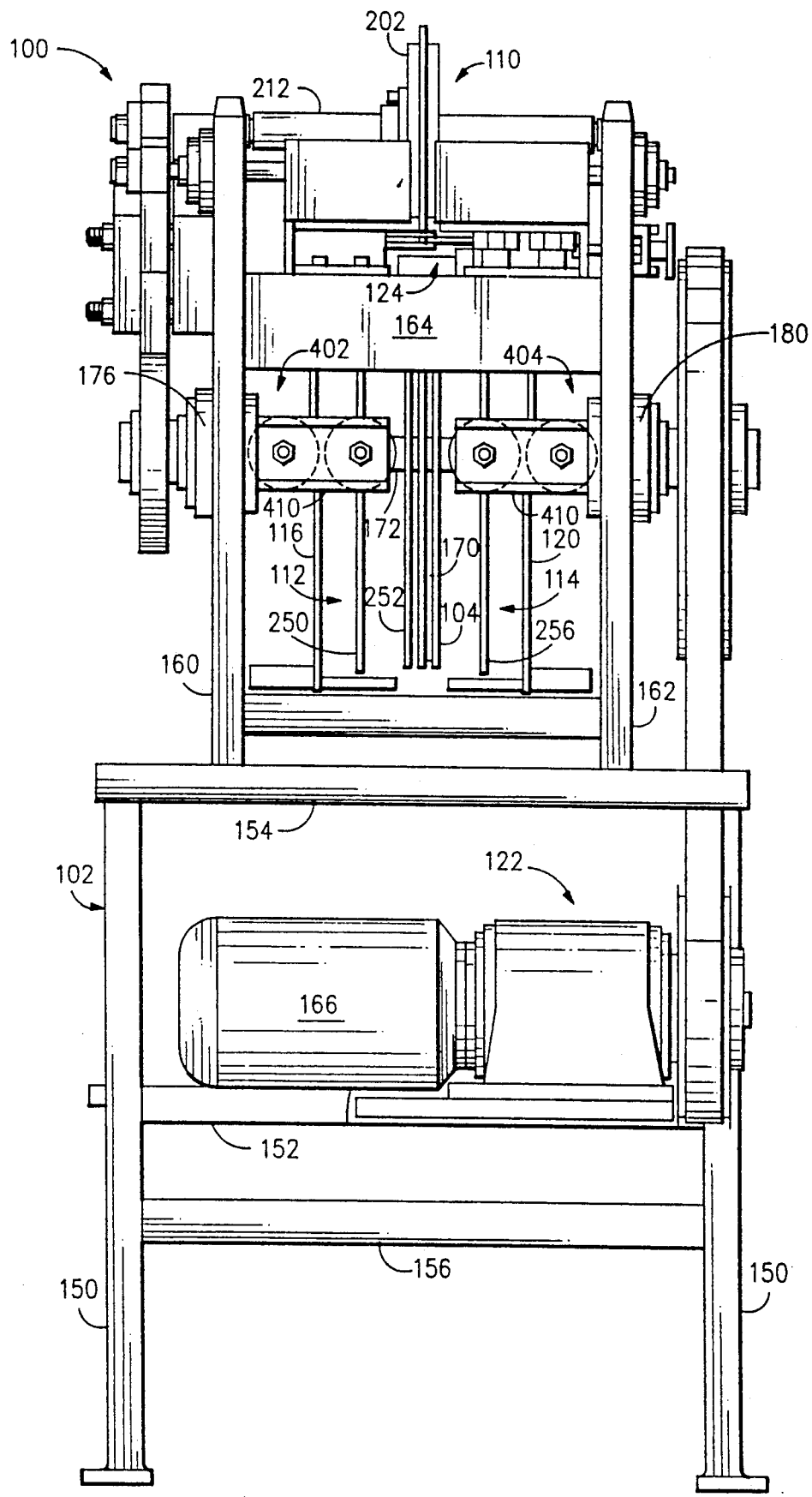
FIG. 1 is a front view of a rotary die press constructed according to the present invention.

In press 100, the subassemblies 410 of support assembly 402 are connected to side frame member 160 and extend therefrom, to the right as viewed in FIG. 1, and left drive plate 116 is clamped between the two rollers of each of the subassemblies of assembly 402. Likewise, the subassemblies 410 of assembly 404 are connected to side frame member 162 and extend therefrom, to the left as viewed in FIG. 1, and right drive plate 120 is clamped between the two rollers of each of the subassemblies of this support assembly.

As viewed in FIG. 1, the left drive plate slants downwardly slightly to the left. To support the left drive plate in this way, the lateral position of the gap 432 between the two rollers of each left support subassembly 410 depends upon the position of that subassembly along the height of the drive plate 116. The subassemblies 410 of the right support assembly 404 support the right drive plate 404 in a similar manner. More specifically, gaps 432 of the right subassemblies 410 are laterally positioned as necessary in order to hold drive plate 120 in the desired shape.

Drive means 122, generally, is connected to die plate 104, left and right punch assemblies 112 and 114, the left and right punch drive plates 116 and 120, and feed wheel 202 to rotate these elements of press 100. With reference again to FIG. 1-3, the embodiment of drive means 122 disclosed therein comprises electric motor 166 securely mounted on plate 152 of support frame 102. This electric motor is connected to die plate 104 via pulleys 452 and 454, pulley belt 456 and support shaft 172; and the motor is connected to the left and right punch assemblies and to the left and right punch drive plates via the die plate itself. More specifically, pulley 452 is mounted on motor output shaft 460 for unitary rotation therewith, and pulley 454 is mounted on support shaft 172 for unitary rotation therewith. Pulley belt 456 is mounted on and extends between the pulleys 452 and 454 so that rotation of pulley 452 causes the pulley belt to move in an endless loop around both pulleys 452 and 454, and to rotate the latter pulley 454, which in turn rotates shaft 172 and die plate 104.

Pulleys 452 and 454 may be mounted on shafts 460 and 172, respectively, in any acceptable manner. For example, bearing 462 may be mounted on shaft 460 and used to connect pulley 452 thereto for unitary rotation with the shaft and to hold the pulley axially in place along the shaft, and bearing 464 may be secured on shaft 172 and used to connect pulley 454 to this shaft for rotation therewith and to hold the pulley axially in place. Preferably, each of the pulleys 452 and 454 includes a multitude of outside teeth (not shown), and the inside surface of pulley belt 456 forms a multitude of complementary shaped teeth (also not shown) that engage the pulley teeth to help move the pulley belt around pulley 452 and to help rotate pulley 454 with the pulley belt 456.

As will be understood by those of ordinary skill in the art, other means may be used to transmit power from motor 166 to shaft 172 to rotate that shaft. For instance, instead of using a pair of pulleys and a pulley belt, a pair of sprockets may be mounted on shafts 460 and 172, and these sprockets may be connected by a chain such that rotation of the sprocket on shaft 460 causes the sprocket on shaft 172, and that shaft itself, to rotate.

Figure 2:
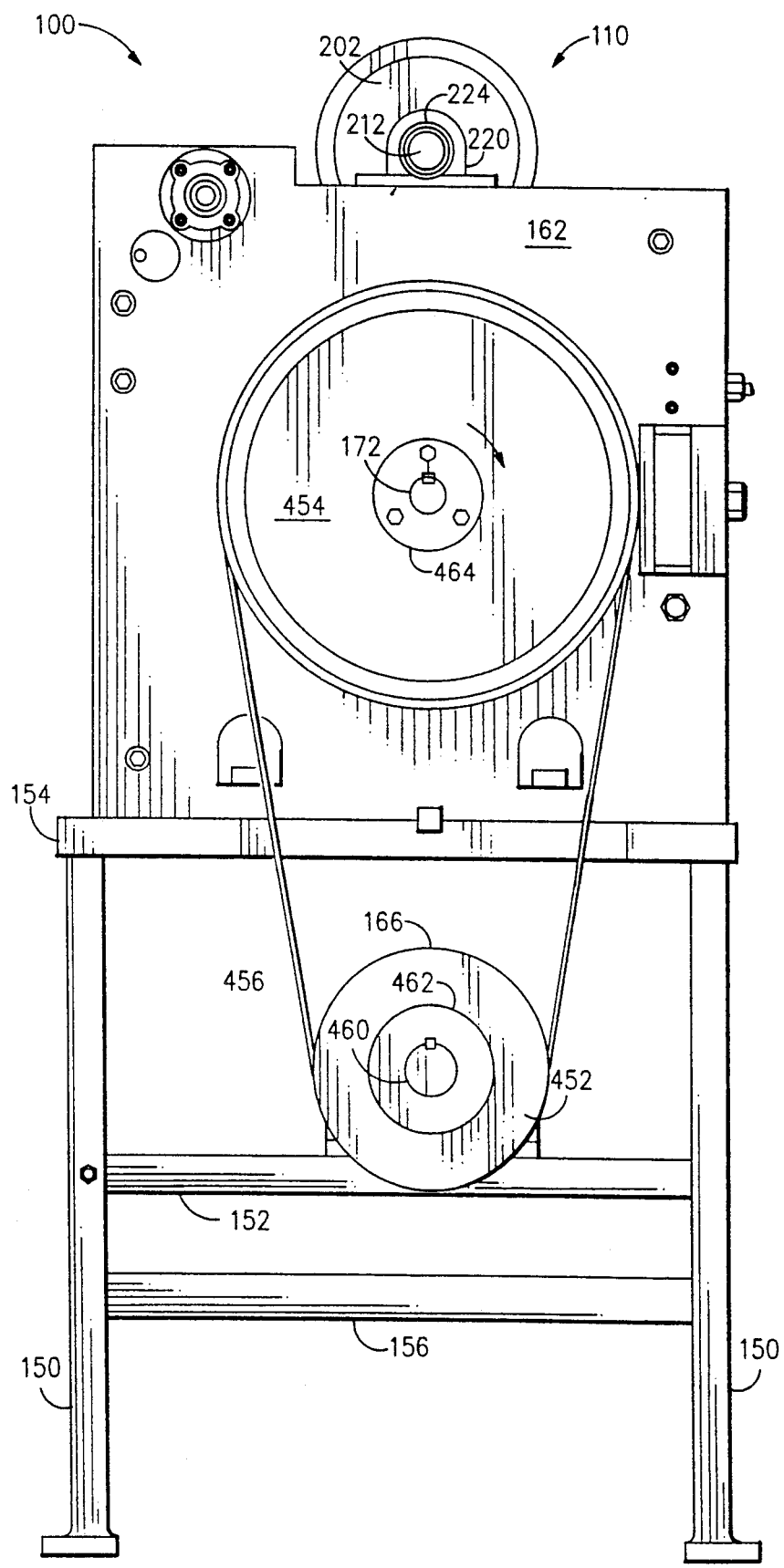
FIG. 2 is right side view of the press of FIG. 1.

Motor 166 may be used to rotate the die plate 104 at any desired rotational speed, within given limits; however, preferably, once the desired rotational speed of the die plate is selected, motor 166 is capable of rotating the die plate at a constant rotational speed. As shown in FIG. 2, pulley 454 is larger than pulley 452, and thus the rotational speed of the former pulley is less than the rotational speed of the latter pulley. Any suitable motor may be employed in the practice of the present invention; and, for example, motor 166 may be a three phase ac electric motor adapted for use with a 220 volt or a 440 volt ac electric power source and that produces an output power of 5 horse power.

Figure 3:
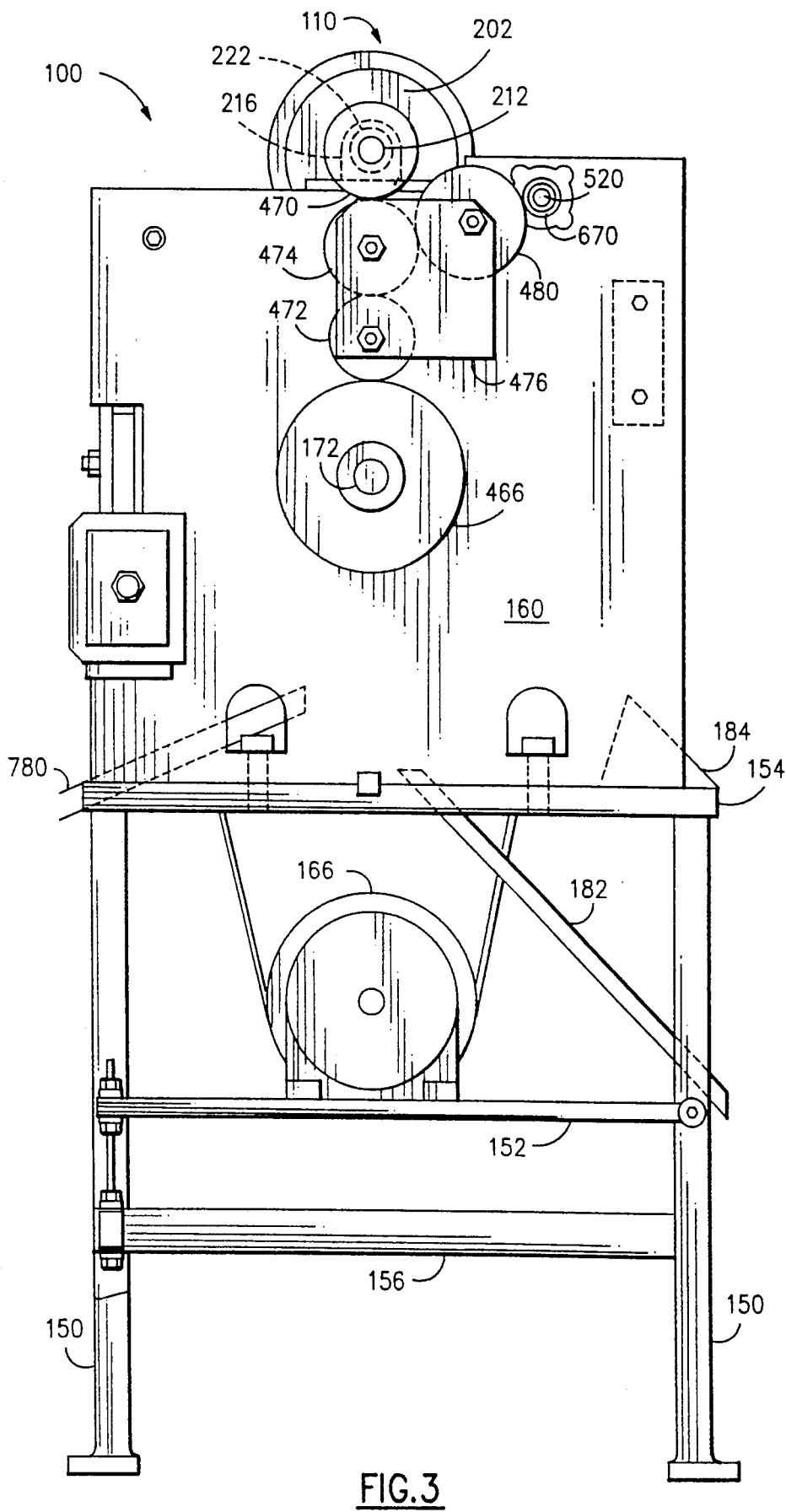
FIG. 3 is a left side view of the rotary press shown in FIG. 1.
Figure 4:
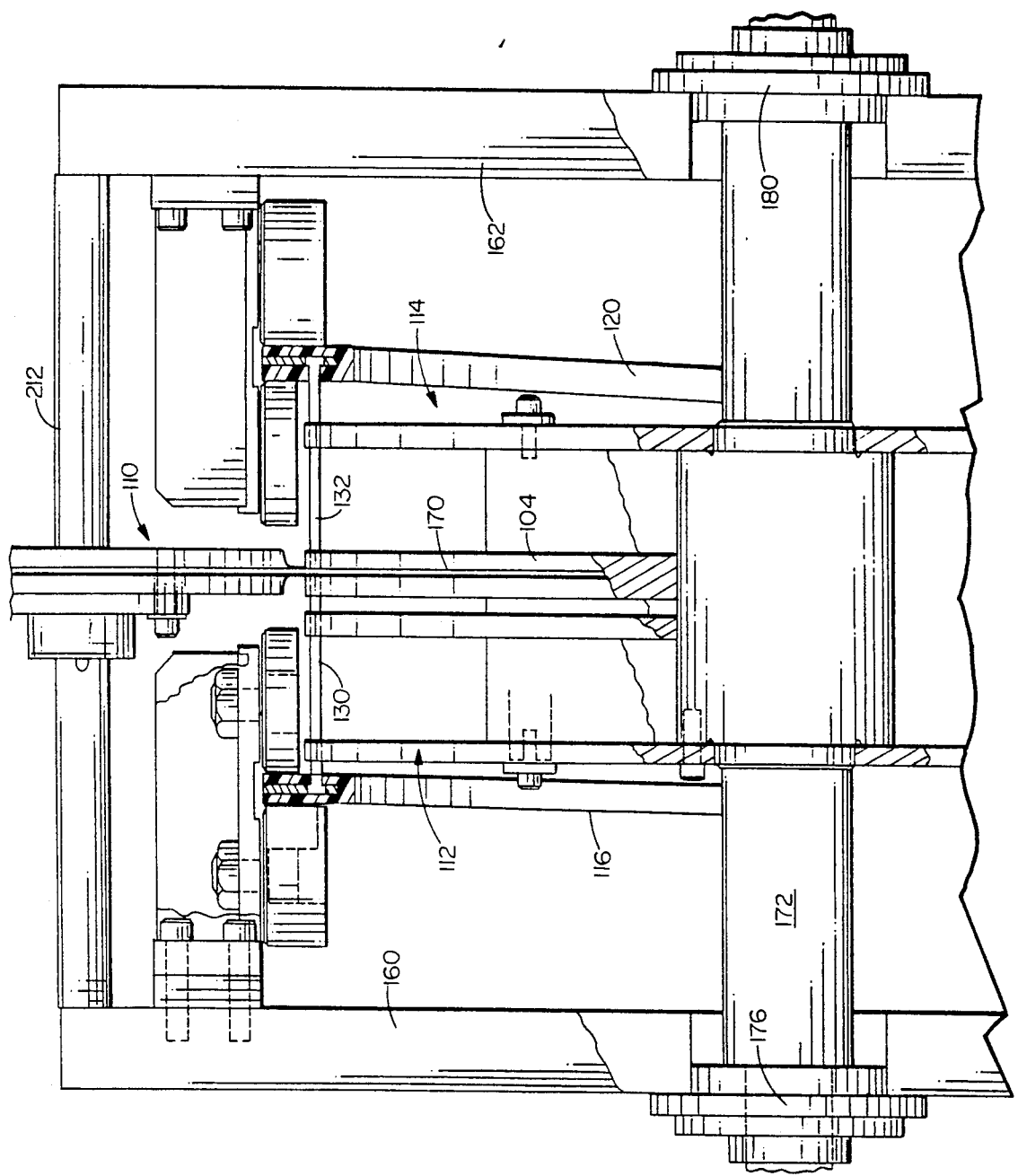
FIG. 4 is a front view of a portion of the rotary press.

With particular references to FIG. 3, motor 166 is connected to feed wheel 202 by means of shafts 172 and 212 and gears 466, 470, 472 and 474. Gear 466 is mounted on shaft 172 for unitary rotation therewith, gear 470 is mounted on shaft 212 for unitary rotation with this shaft, and gears 472 and 474 are rotatably mounted on frame member 160, between gears 466 and 470. Gear 466 drivingly engages gear 472, this gear drivingly engages gear 474, and this latter gear drivingly engages gear 470. As motor 166 rotates shaft 172 as described above, this shaft rotates gear 466. This rotates gear 470, via gears 472 and 474, and gear 470 rotates shaft 212 and feed wheel 202. A plate 476 may be connected to gears 472 and 474, as well as to a gear 480 discussed below, to help support these gears.

Figure 31:
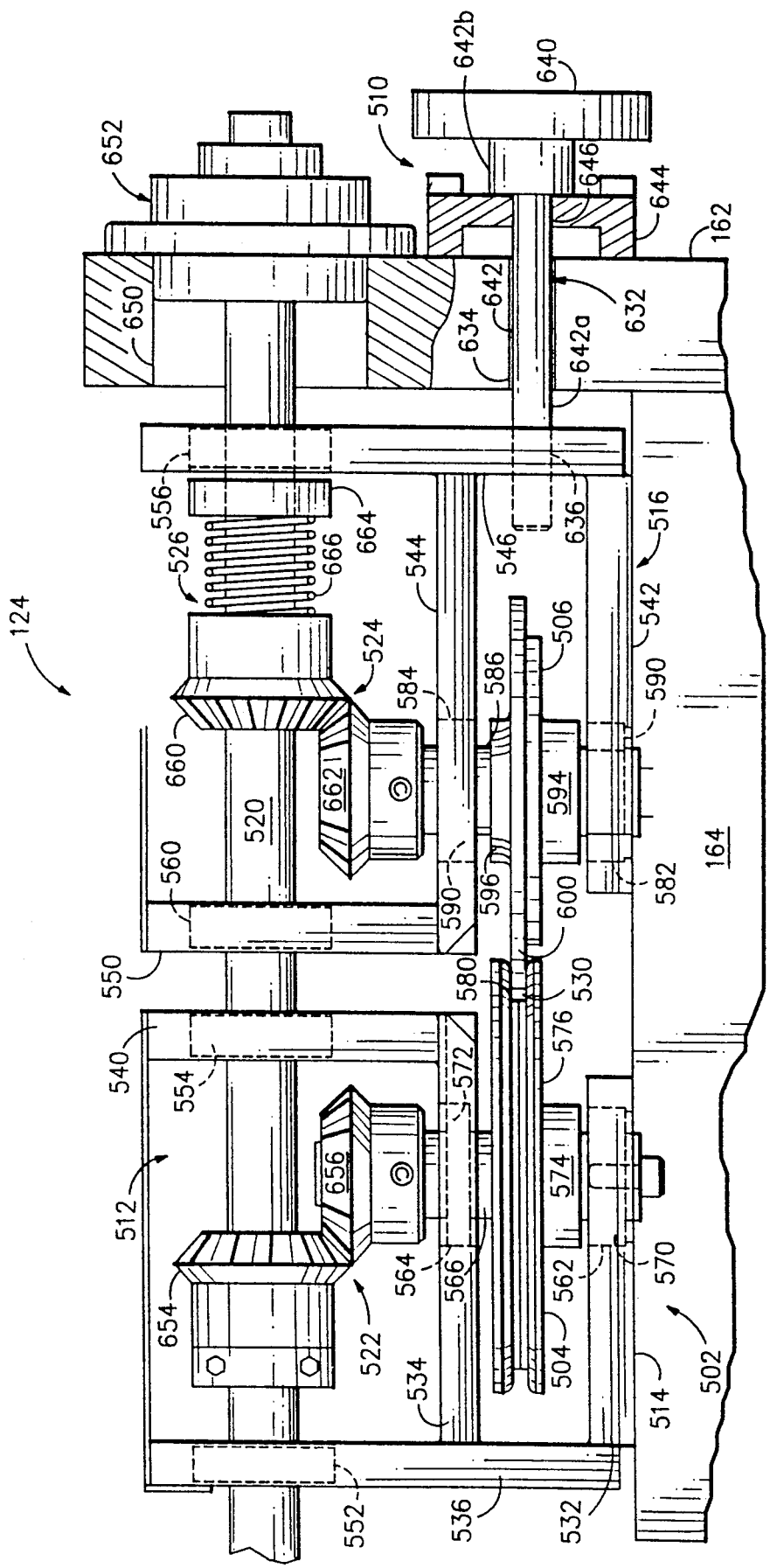
FIG. 31 is a front view particularly showing the food control means of the rotary press.
Figure 32:
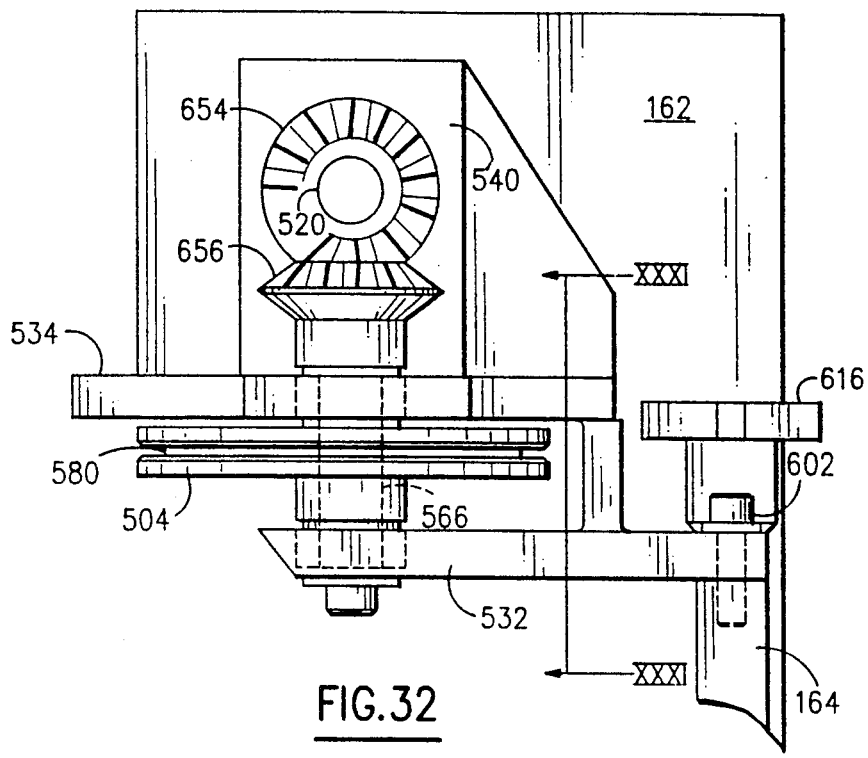
FIG. 32 is a side view of the food control means.
Figure 33:
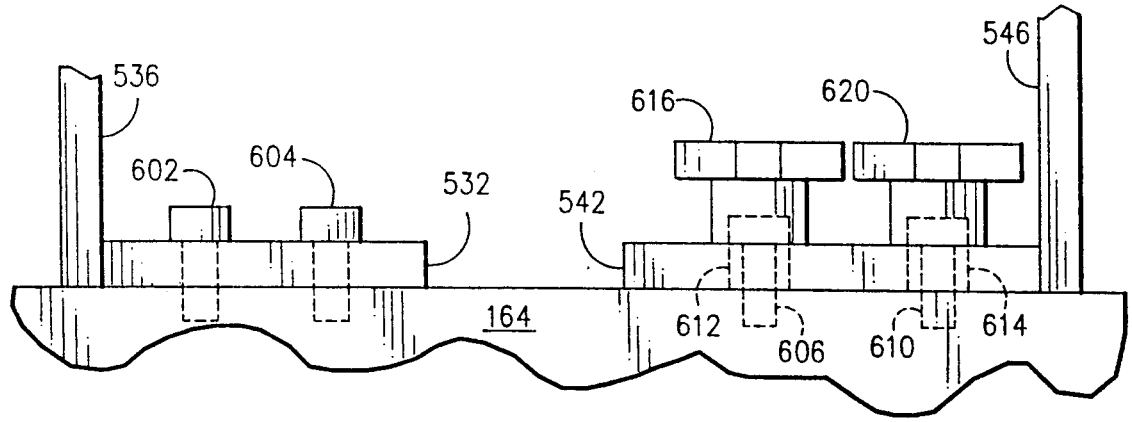
FIG. 33 and 34 illustrate how the food control means are connected to a support frame of the rotary press.

Preferably, as previously mentioned, press 100 also includes control means 124 to control the rate at which food material is conducted to the die cavities of the die plate; and more specifically, to control the rate at which the food material is conducted to feed wheel 202. With reference to FIGS. 31 to 33, this control means preferably comprises support assembly 502, first and second rollers 504 and 506 and adjusting means 510, and preferably, the control means further includes roller drive means 512. Support assembly 502 includes left and right subassemblies 514 and 516; and drive means 512 includes roller drive shaft 520, first and second gear means 522 and 524 and biasing means 526.

Support assembly 502 is connected to and supported by support frame 102 of rotary press 100. Rollers 504 and 506 are both rotatably supported by subassembly 502 and are located adjacent each other and form feed gap 530 therebetween to receive a rope of food material from a source thereof and to conduct that rope of material between the first and second rollers. Roller 506 is also supported by assembly 502 for movement toward and away from roller 504, and adjusting means 510 is connected to assembly 502 to move roller 506 toward and away from roller 504 to vary the size of feed gap 530, and, thereby, to control the rate at which the food material is directed to the die cavities of the die plate. Roller drive means 512 is preferably connected to rollers 504 and 506 to rotate those rollers so that these rollers pull the rope of food material through feed gap 530 and direct that material to die plate 104.

More specifically, subassembly 514 includes lower plate 532, upper plate 534, connecting plate 536 and guide member 540; and subassembly 516 includes lower plate 542, upper plate 544, connecting plate 546 and guide member 550. Lower plate 532 is connected to and extends rearward from front plate 164 of support frame 102, connecting plate 536 is connected to and extends upward from a left edge of lower plate 532, and upper plate 534 is connected to and extends to the right from connecting plate 536. Plate 534 is substantially parallel to and extends over plate 532. Connecting plate 536 extends upward from upper plate 534, and forms a shaft opening 552, and guide member 540 is connected to and extends upward from a right edge of upper plate 534 and forms shaft opening 554 aligned with shaft opening 552. Drive shaft 520 extends through openings 552 and 554 and is rotatably supported by plates 536 and 540. Bearings may be disposed in openings 552 and 554 to facilitate rotation of shaft 520 relative to plates 536 and 540.

Lower plate 542 is connected to and extends rearward from front plate 164 of support frame 102, connecting plate 546 is connected to and extends upward from a right edge of lower plate 542 and upper plate 544 is connected to and extends to the left from connecting plate 546. Plate 544 is substantially parallel to and extends over plate 542. Connecting plate 546 extends upward from upper plate 544, and forms shaft opening 556; and guide plate 550 is connected to and extends upward from a left edge of upper plate 544, and forms shaft opening 560 aligned with shaft opening 556. Drive shaft 520 extends through openings 556 and 560; and, in this way, the drive shaft helps to support plates 546 and 550. As discussed below, plates 546 and 550 also guide movement of plates 542 and 544 and roller 506 along the drive shaft. Bearings may be disposed in openings 556 and 560 to facilitate rotation of shaft 514 relative to plates 546 and 550 and to facilitate movement of those plates along the roller drive shaft.

Roller 504 is disposed between and is rotatably supported by plates 532 and 534. In particular, lower plate 532 forms opening 562, upper plate 534 forms opening 564, which is aligned with opening 562, and roller shaft 566 extends into and between openings 562 and 564, perpendicular to plates 532 and 534. Roller shaft 566 is axially supported by lower plate 532, and in particular, bearing 570 is disposed in opening 562 to support shaft 566 axially and to facilitate rotation of this shaft. Bearing 572 may be held in opening 564 to facilitate rotation of shaft 566 relative to plate 534. Roller 504 is mounted on shaft 566, concentric with and for rotation with the shaft. As shown in FIG. 31, roller 504 includes a lower hub portion 574 and a disc-shaped portion 576 connected to and located above the hub portion. Disc portion 576 extends radially outward away from roller shaft 566, and the outer annular peripheral surface of this disc portion forms an annular groove 580. This groove 580 circumferentially extends completely around roller 504 and has a uniform shape over the circumference of the roller.

Similarly, roller 506 is disposed between and is rotatably supported by plates 542 and 544. Lower plate 542 forms opening 582, upper plate 544 forms opening 584, which is aligned with opening 582, and roller shaft 586 extends into and between openings 582 and 584, perpendicular to plates 542 and 544 and parallel to roller shaft 566. Shaft 586 is axially supported by lower plate 542, and more specifically, bearing 590 is disposed in opening 582 to support shaft 566 axially and to facilitate rotation of this shaft. Bearing 592 is positioned in opening 584 to facilitate rotation of shaft 566 relative to plate 544. Roller 506 is mounted on shaft 586, for rotation with and concentric with this shaft. As illustrated in FIG. 31, roller 506 includes lower hub portion 594, upper hub portion 596 and disc portion 600 located between and connected to both hub portions.

Disc portion 600 extends radially outward away from roller shaft 586 and into groove 580 of roller 504. The outer annular portion of disc 600 is closely adjacent and may engage opposing surfaces of disc portion 576, and the outer circumferential surface of disk 600 is slightly spaced from the radially inside surface of groove 580; and in this way, disc portions 576 and 600 form gap 530 therebetween.

Any suitable means may be used to connect subassemblies 514 and 516 to plate 164. Preferably, though, these subassemblies are releasably connected to that plate; and, for instance, as illustrated in FIG. 33, bolts 602, 604, 606 and 610 may be used to connect plates 532 and 542 —and hence the subassemblies 514 and 516—the top edge of plate 164. For the sake of clarity, these bolts are not shown in FIG. 31.

Figure 34:
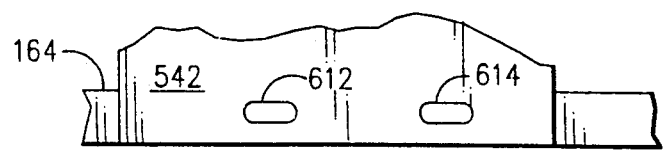

Moreover, preferably the position of subassembly 516 can be adjusted along plate 164. To allow for this, with particular reference to FIGS. 33 and 34, a forward portion of plate 542 forms two spaced, elongated through openings 612 and 614, and bolts 606 and 610 extend through openings 612 and 614 respectively to releasably connect plate 542 to plate 164. To adjust the position of plate 542—and thus of the entire subassembly 516 and roller 506—bolts 606 and 610 loosened and plate 542 is simply slid along the top edge of plate 164 to the desired new position. Bolts 606 and 610 may then be retightened to secure plate 542, and subassembly 516, in its new position. Clamps 616 and 620 may be mounted on bolts 606 and 610 to facilitate loosening and tightening those bolts.

As mentioned above, adjusting means 510 is connected to support assembly 502 to move roller 506 toward and away from roller 504 to vary the size of gap 530. With the embodiment of control means 124 illustrated in the drawings, adjusting means 510 includes a threaded screw 632. Screw 632 is rotatably supported by support frame 102 of press 100, and is connected to that support frame so that the screw may be axially held in place as it rotates. Also, screw 632 extends through opening 634 in the support frame, and through threaded opening 636 in connecting plate 546; and in particular, the screw engages internal threads on the surfaces of plate 546 that form opening 636.

More specifically, screw 632 includes head 640 and shank 642, which extends outward from the screw head. Shank 642 has a cylindrical shape and includes a threaded portion 642a and an increased diameter neck portion 642b, disposed between threaded portion 642a and screw head 640. Bracket 644 is securely connected to support frame 102, around opening 634, and this bracket forms a central through opening 646. Screw 632 extends through this opening 646; and abutting contact between neck portion 642b and bracket 644 limits or prevents axial movement of the screw to the left as viewed in FIG. 31. With the above-described arrangement, when subassembly 516 is loosened from plate 164, rotation of screw 632 slides plates 542, 544 and 546, and thus roller 506, either to the left or to the right as viewed in FIG. 31 to move that roller toward or away from roller 504.

Roller drive shaft 520 is rotatably supported by support frame 102 of press 100 and transversely extends thereacross. More specifically, side frame members 160 and 162 form aligned openings, one of which is shown at 650 in FIG. 31, and the roller drive shaft extends through these openings and between those frame members. Bearing assemblies one of which is shown at 652 in FIG. 31, are disposed in these aligned openings to facilitate rotation of the roller drive shaft; and, as previously mentioned, the roller drive shaft also passes through openings 552, 554, 556 and 560 of support assembly 502.

Gear assembly 522 engages drive shaft 520 and roller shaft 566 to rotate the latter shaft, and thus roll 504, with the drive shaft; and gear assembly 524 engages drive shaft 520 and roller shaft 586 to rotate the latter shaft, and thus roller 506, with the drive shaft. With the embodiment of the roller drive means 512 shown in FIG. 31, gear assembly 522 includes first and second bevel gears 654 and 656. Gear 654 is securely mounted on shaft 520 for unitary rotation therewith and to hold this gear axially in place on this shaft, and gear 656 is securely mounted on shaft 566 for unitary rotation therewith and to hold this gear axially in place on shaft. The teeth of gear 654, which slant at an angle of approximately 45° to the axis of shaft 514, engage the teeth of gear 656, which slant at an angle of approximately 45° to the axis of shaft 566, and rotation of the former gear rotates the latter gear.

Gear assembly 524 includes third and fourth bevel gears 660 and 662. Gear 660 is mounted on shaft 520 for unitary rotation therewith; however, this gear is also supported for limited axial sliding movement along shaft 520. Gear 662 is securely mounted on shaft 586 for unitary rotation therewith and to hold this gear axially in place on this shaft. The teeth of gear 662, which slant at an angle of approximately 45° to the axis of shaft 520, drivingly engage the teeth of gear 664, which slant at an angle of approximately 45° to the axis of shaft 586, and rotation of the former gear rotates the latter gear.

Gear 660 is allowed to slide along shaft 514 so that this gear can continue to engage gear 662 as the latter gear moves with roller 506 and shaft 586, toward and away from roller 504. Biasing means 526 is provided to urge gear 660 toward gear 662 to maintain these gears in driving engagement as gear 662 moves with roller 506 and shaft 586 toward and away from roller 504. Biasing means 526 illustrated in FIG. 31 comprises collar 664 and spring 666. Coller 664 encircles the roller drive shaft 520 and is secured thereto for rotation with this shaft and to hold the coller securely in place along the axis of the shaft. Spring 666 encircles shaft 520, and this spring is disposed between and abuts against both coller 664 and gear 660, urging that gear away from the coller and toward gear 662. To mount gear 660 on shaft 520 in the desired manner, an axial groove (not shown) may be formed on the shaft surface, radially inside the gear, and a pin or similar means (also not shown) may be secured on the gear so as to radially project into this groove. The pin is able to slide within this groove, allowing gear 660 to slide over that groove; however, abuttment between the pin and the surfaces that form the groove limits axial movement of the gear along shaft and forces that gear to rotate with shaft 520.

Any suitable arrangement may be used to rotate roller drive shaft 520; and, for example, a separate electric motor may be used to rotate that shaft. Preferably, though, motor 166 is used to rotate the roller drive shaft. With reference to FIG. 1 and 3, shaft 520 may be connected to motor 166 via shaft 172 and a transmission means comprising gears 466, 472, 474, 480 and 670. Gears 466, 472 and 474 have already been discussed, and these gears all rotate with shaft 172. Gear 480 is rotatably supported by frame member 160 and drivingly engages gear 474; and gear 670 is mounted on shaft 520 to rotate that shaft, and this latter gear drivingly engages gear 480. As motor 166 rotates shaft 172 in the manner described above, that shaft rotates gear 466. This causes gears 472, 474, 480 and 670 to rotate, and the latter gear rotates shaft 520 and rollers 504 and 506.

Figure 35:
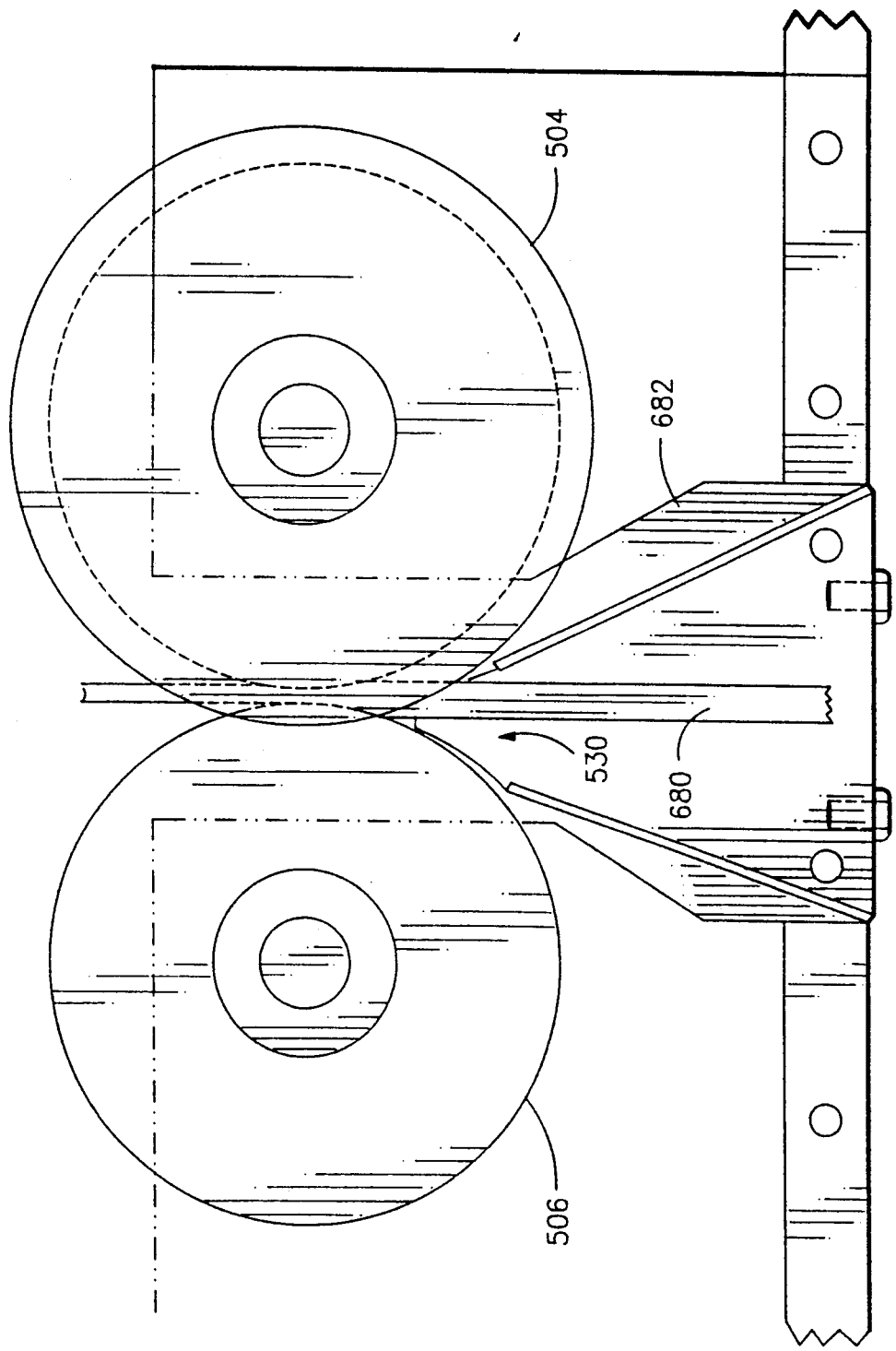
FIG. 35 shows a rope of a food material being conducted to the rollers of the food control means.

FIG. 35 illustrates one arrangement for feeding a rope of food material, generally reference at 680, to rollers 504 and 506, and specifically, to gap 530. Tray 682 is connected to support frame 102, adjacent those rollers; and the food material 680 is deposited on the tray, by hand or by mechanical means, from a source of the food material. Tray 682 then guides and conducts the rope 680 to gap 530, from where the rope 680 is fed to annular groove 170 of the die plate 104.

In addition to the foregoing, press 100 may be provided with material sensing means to sense the amount of food material in the die cavities and to generate a signal indicating that amount. This signal may be used, for example, to determine whether individual tablets formed in the die cavities are within acceptable dimensional limits. The signal may also be employed to actuate food supply control means to increase or to decrease, as appropriate, the rate at which food material is conducted to the die cavities to increase or to decrease the size of the tablets formed therein.

Figure 36:
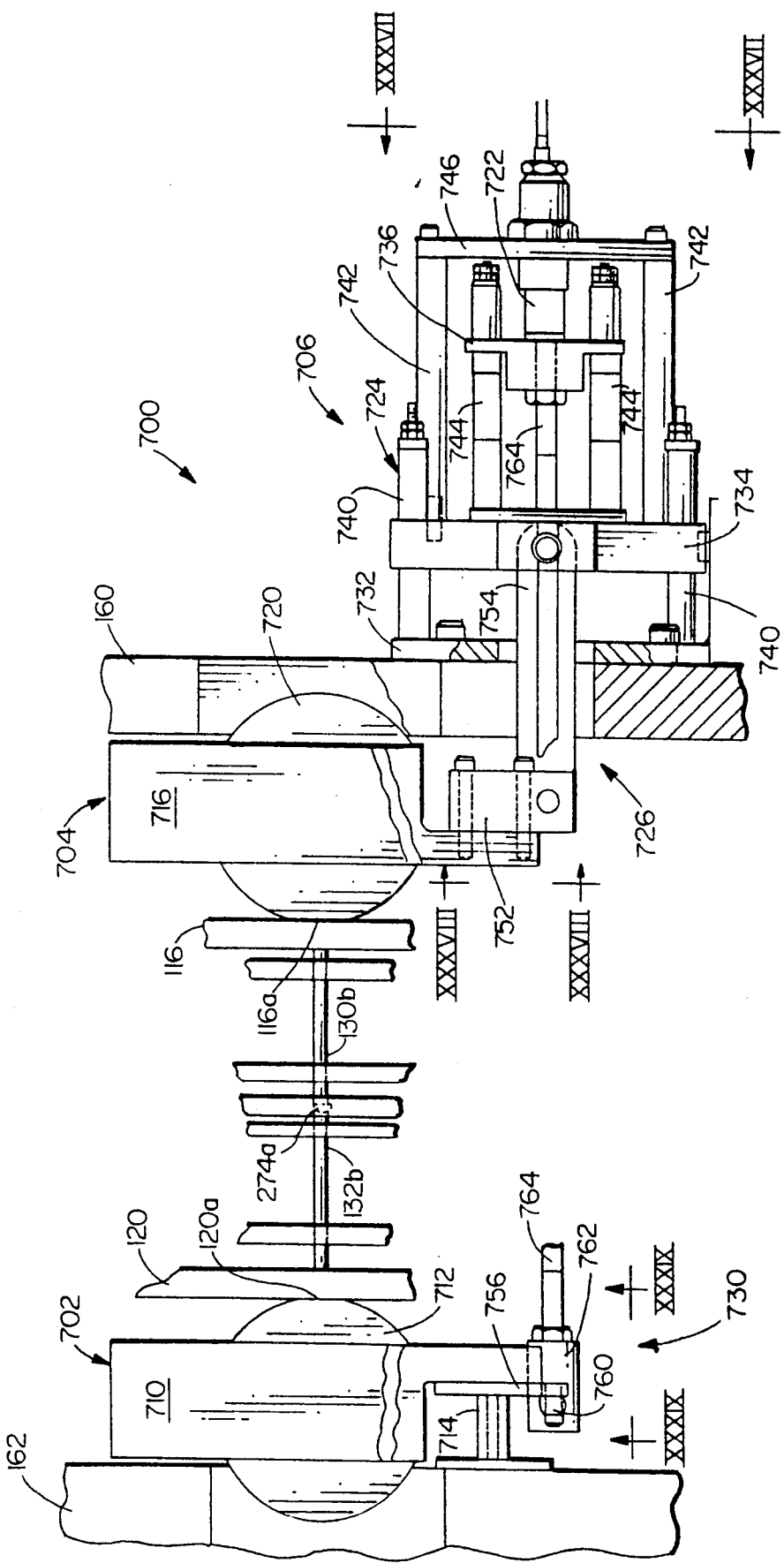
FIG. 36 illustrates a material sensing means that may be used to determine the amount of material in the individual die cavities of the rotary press.
Figure 37:
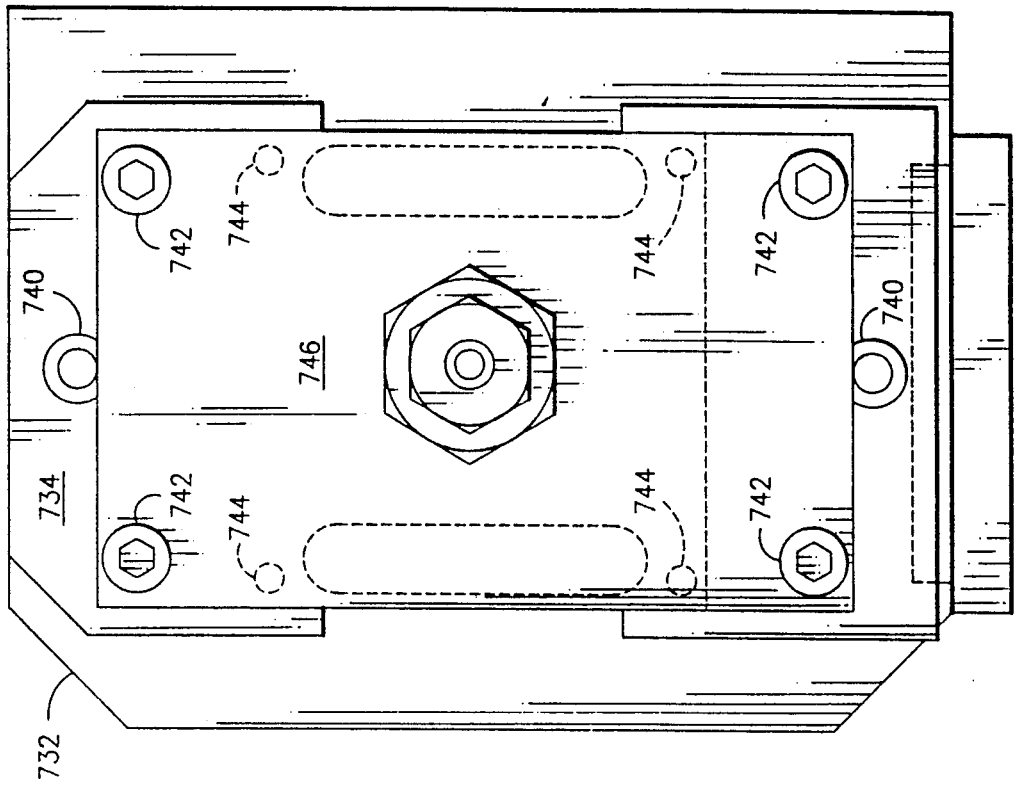
FIG. 37 is a side view of the material sensing means.

FIGS. 36–39 illustrates a preferred material sensing means, generally referenced at 700. Generally, this sensing means operates by sensing axial movement or flexing of at least one of the punch drive plates 116 and 120. More particularly, this is done by sensing relative axial movement or flexing between the portions of the drive plates that engage the left and right punches at the point in the cycle of movement of these punches at which the punches are applying the final compression to the food material in the die cavities—that is, the position of the punches shown in FIG. 14c. These portions of drive plates 116 and 120 are referenced in FIG. 36 at 116a and 120a respectively. FIG. 36 also shows one particular right punch at 132b, and one specific left punch at 130b. The specific tablet being formed between these two specific punches is referenced at 274a in a FIG. 36. It should be noted that FIG. 36 is taken from the back side of press 100 so that left punch 130b is seen on the right side of right punch 132b, and the right drive plate 120 is seen on the left side of die plate 104. In the operation of press 100, the left and right punches mold the food material in the die cavities 126 to a selected shape; and thus, the size of the tablets formed by the rotary press may vary depending, in part, on the amount of food material in the die cavities. With particular reference to FIG. 36, as the size of the tablets in the die cavities varies, the specific axial position of the punches 130b and 132b will also vary slightly.

For example, if the size of a compressed tablet is smaller than the one shown at 274a in FIG. 36, then the axial position of left punch 130b is slightly to the left of the position shown in FIG. 36, and the axial position of right punch 132b is slightly to the right of the position shown in FIG. 36. Conversely, if the size of a compressed tablet is larger than the one shown at 274a in FIG. 36, then the axial position of left punch 130b is slightly to the right of the position shown in FIG. 36, and the axial position of right punch 132b is slightly to the left of the position shown in FIG. 36. Because the left and right drive plates are connected to the left and right punches, respectively, for axial movement with those punches, any change in the axial position of the left and right punches causes a change in the axial position of drive plates 116 and 120, respectively. Hence, the axial position of drive plate portions 116a and 120a is an indication of the amount of food material in the die cavity.

Generally, material sensing means 700 includes first and second lateral assemblies 702 and 704 and position sensing means 706. More specifically, assembly 702 includes mounting bracket 710, roller 712 and spring 714; assembly 704 includes mounting bracket 716 and roller 720; and position sensing means 706 includes sensor 722, mounting assembly 724 and first and second connecting means 726 and 730. Mounting assembly 724, in turn, includes base plate 732, pneumatic cylinder 734, moveable member 736 and first, second and third sets of rods 740, 742 and 744.

Lateral assemblies 702 and 704 are moveably supported by support frame 102 of press 100, and these assemblies engage and axially move with portions 116a and 120a of drive plates 116 and 120, respectively. With the embodiment of sensing means 700 shown in FIG. 36, a first end of bracket 710 is pivotally connected to support frame member 162 by any suitable means (not shown); and roller 712 is rotatably mounted on bracket 710, intermediate the ends thereof, and engages portion 120a of drive plate 120. Spring 714 is disposed between support frame member 162 and a lower portion of bracket 710 to urge that portion of the bracket and roller 712 to the right as viewed in FIG. 36, and in particular, to force roller 712 against drive plate portion 120a. Similarly, a first end of bracket 716 is pivotally connected to support frame member 160 by any suitable means (not shown); and roller 720 is rotatably mounted on bracket 716, intermediate the ends thereof, and this roller engages portion 116a of drive plate 116. With the above-described arrangements, as portion 120a of drive plate 120 moves to the right or to the left as viewed in FIG. 36, roller 712 and the second end of bracket 710 also move to the right or to the left, respectively; and as portion 120a of drive plate 120 moves to the right or to the left as viewed in FIG. 36, roller 720 and the second end of bracket 716 likewise move to the right or the left, respectively.

Position sensing means 706 is provided to generate a signal indicating movement of lateral assembly 702 relative to lateral assembly 704, and more specifically, movement of the second end of bracket 710 relative to the second end of bracket 716. With the embodiment of sensing means 706 shown in FIG. 36, mounting assembly 724 is securely connected to support frame 102, sensor 722 is supported by that mounting assembly for axial movement, and the sensor is connected via first connecting means 726 to a second end of bracket 716 for axial movement therewith. At the same time, moveable member 750 is located adjacent sensor 722 and is also supported by mounting assembly 724 for axial movement, and second connecting means 730 connects moveable member 750 to a second end of bracket 710 for axial movement therewith.

Even more specifically, base plate 732 of mounting assembly 724 is securely connected to support frame 102, and guide rods 740 are securely connected to and extend from the base plate. Pneumatic cylinder 734 is mounted on guide rods 740 and is supported thereby for axial sliding movement therealong. A second set of support rods 742 are connected to pneumatic cylinder 734 and extend outward therefrom. Sensor mounting bracket 746 is connected to and extends across support rods 742, and sensor 722 is securely mounted on bracket 746, centrally thereof. A third set of rods 744 is connected to pneumatic cylinder 734 and also extend outward therefrom, and moveable member 736 is mounted on these guide rods 744 for sliding movement therealong, toward and away from the sensor 722.

First connecting means 726 is connected to and extends between pneumatic cylinder 734 and a second end of bracket 716, and this connecting means serves two purposes. First, connecting means 726 transmits forces from pneumatic cylinder to bracket 716, which in turn forces roller 720 against drive plate 116 to force left punches 130b to compress the food material in the die cavity. Second, connecting means 726 causes pneumatic cylinder 734—and thus connecting rods 742 and sensor 722—to move axially with the second end of bracket 716. To elaborate, as the lower end of bracket 716 pivots to the right or left as viewed in FIG. 36, the bracket pushes or pulls connecting means 726, and this slides the pneumatic cylinder to the right or to the left, respectively. This, in turn, moves guide rods 742, mounting bracket 746 and sensor 722 to the right or to the left respectively.

Second connecting means 730 is connected to and extends between moveable member 736 and a second end of bracket 710, and this connecting means causes that moveable member to move axially with the second end of this bracket. In particular, as viewed in FIG. 36, as the lower end of bracket 710 pivots to the right or left, the bracket pushes or pulls connecting means 730, and this moves member 736 to the right or left, respectively, along guide rods 744.

With this arrangement, if the amount of food material in die cavities 126 increases, then lower portions 116a and 120a of the drive plates 116 and 120 move axially away from each other, and this causes the lower ends of brackets 710 and 716 to pivot away from each other. As the lower end of bracket 710 pivots, moveable member 736 is pulled with it, to the left as viewed in FIG. 36; and as the lower end of bracket 716 pivots, sensor 722 is pushed to the right as viewed in FIG. 36. Analogously, if the amount of food material in the die cavities decreases, then lower portions 116a and 120a of the drive plates move axially toward each other, and the lower ends of brackets 710 and 716 pivot toward each other. As viewed in FIG. 36, as the lower end of bracket 710 pivots, moveable member 736 is pushed to the right; while as the lower end of bracket 716 pivots, sensor 722 is pulled to the left.

Sensor 722 generates a signal indicating the distance between that sensor and moveable member 736. As mentioned above, this signal may be used to indicate whether the formed tablets are within given size or weight limits, or the signal may be used to operate control means 124 to adjust the amount of food material being conducted to die plate 104. Any suitable sensor may be employed in the practice of this invention, and many such sensors are well known in the art.

Figure 38:
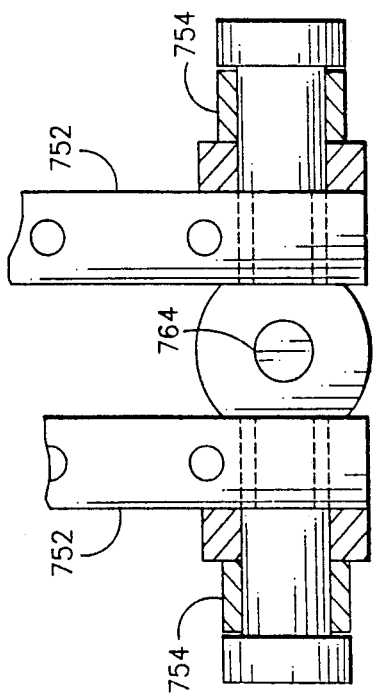
FIG. 38 is an enlarged view of a portion of the material sensing means, taken along line XXXVIII—XXXVIII of FIG. 36.
Figure 39:
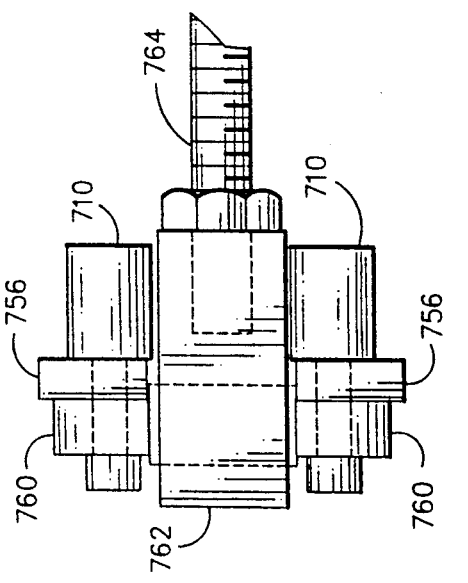
FIG. 39 is an enlarged view of another portion of the material sensing means, taken along line XXXIX—XXXIX of FIG. 36.

Any suitable numbers of rods may be used in the rod sets 740, 742 and 744. For instance, with reference to FIGS. 36 and 37, set 740 may include two rods, and sets 742 and 744 may each comprise four rods. With reference to FIGS. 36 and 38, first connecting means 726 comprises a pair of connecting plates 752 and a pair of connecting links 754. Each of the plates 752 is connected to the second end of bracket 716, and each of the links 754 is pivotally connected to a respective one of the plates 752. The links 754 extend from those plates and are also connected to pneumatic cylinder 734. With reference to FIGS. 36 and 39, second connecting means 730 comprises a pair of connecting plates 756, shaft 760, pivot member 762 and connecting link 764. Plates 756 are securely connected to the second end of bracket 710 and extend downward therefrom, shaft 760 is connected to and extends between these plates 756, and pivot member 762 is pivotally mounted on shaft 760. A first end of link 764 is connected to member 762 for pivotal movement therewith about shaft 760; and this link 764 extends transversely past drive plates 116 and 120 through a central opening in base plate 732, through a central opening in pneumatic cylinder 734, and is connected to moveable member 736.

Also, as will be understood by those of ordinary skill in the art, air may be conducted to or from pneumatic cylinder 734 in any conventional manner to develop and to maintain the desired pressure of rollers 712 and 720 against drive plate portions 116a and 120a respectively.

The operation of press 100 will be apparent from a review of the foregoing. However, that operation will now be described in order to better illustrate how various components of the press cooperate to achieve the desired results.

In the operation of press 100, motor 166 is operated to rotate drive shaft 172 and shafts 212 and 520. As drive shaft 172 rotates, die plate 104 rotates with it; and as the die plate rotates, the multitude of left and right punches 130 and 132 that extend into die cavities 126 of the die plate, rotate with the die plate. This rotation of the left and right punches, in turn, causes the entire left and right punch assemblies 112 and 114 and the left and right drive plates 116 and 120 to also rotate about drive shaft 172. As shaft 212 rotates, this causes feed wheel 202 to rotate about its axis. At the same time, a rope of food material is conducted to and through gap 530 between the rotating feed rollers 504 and 506, and into groove 170 of the die plate. Feed wheel 202 sections that rope of material and forces the material sections into groove 170. As the left and right punch assemblies and the left and right drive plates rotate, the left drive plate reciprocates the left punches and the right drive plate reciprocates the right punches to force material into die cavities 126, to compress the food material into tablets and then to eject the formed tablets from the die cavities.

More specifically, at the top of the die plate, adjacent feed wheel 202, the left and right punches are generally in the position shown in FIG. 14a. The left punches extend into die cavities 126, closing the left ends of those cavities; and the right punches also extend into the die cavities, but terminate to the right of groove 170. As the die plate and the punch assemblies rotate, the right punches move to the left, across groove 170, and force sectioned pieces of food material into the die cavities, on the left side of groove 170. As the die plate and the left and right punch assemblies continue to rotate, the left and right punches move, relative to each other, toward each other, reducing the size of the gap between those punches and compressing the food material in the die cavities into tablets.

The gap between left and right punches reaches a minimum length when the die plate has rotated clockwise approximately 90 degrees from the top vertical centerline of the die plate. At this point in the movement of the left and right punches, the pressure of the food material between the punches is the greatest, and it is at this point that the compression wheels 712 and 720 (shown in FIG. 36) engage drive plates 116 and 120 and help the punches apply the desired force to the food material to force that material into the desired, final shape.

As the die plate and the punch assemblies continue to rotate still further, the left and right punches both move to the left; however, the left punch moves at a faster rate than the right punch, so that the gap between the punches increases. The left punches withdraw from the aligned die cavities, and the right punches moves to the left ends of these cavities, pushing the formed tablets out of the die cavities.

The tablets are ejected from the die plate at a position along the circumference thereof about 155 degrees in the clockwise direction, as viewed from the right side of press 100, from the top of the vertical centerline of the die plate, and the formed tablet then drops downward, between the die plate and the left punch support plate 252. A candy chute 780 is located directly beneath this area of the die plate to receive those tablets, and this chute extends downward and away from the die plate to conduct the tablets away from the die plate to, for example, a storage bin or similar device.

With the above-described process, typically not all of the food material forced into groove 170 of die plate 104 is pushed into the die cavities, and food material is not pushed into those cavities falls downward. Chutes 182 and 184 may be located beneath or adjacent the die plate to receive and to conduct that unused material away from the die plate to, for example, a storage bin or similar device. Preferably, this collected, unused material is subsequently refed to the press.

Press 100 may be used with many types of food materials, and for example, the press may be used with shapeable chewing gum, candy materials or other snack food materials. The press may also be used with shapeable dough or pastry materials.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A press for compressing a food material, comprising:

a support frame;

a die plate supported by the support frame for rotation in a given plane and about a given axis, and forming a multitude of die cavities for receiving the food material;

a first punch assembly rotatably supported by the support frame, and located on a first side of the die plate, and including a multitude of first punches supported for axial reciprocating movement, each of the first punches axially extending in a direction substantially perpendicular to said given plane, and being aligned with and supported for axial reciprocating movement in an associated, respective one of the die cavities, a second punch assembly rotatably supported by the support frame, and located on a second side of the die plate, and including a multitude of second punches supported for axial reciprocating movement, each of the second punches being aligned with and supported for axial reciprocating movement in an associated, respective one of the die cavities;

a first drive plate located adjacent the first punch assembly, and including i) a base member, and ii) a connecting assembly connecting the first punches to the base member for rotary and axial movement therewith to move the first punches toward and away from said given plane as the base member rotates;

means supporting the first drive plate for rotation about the given axis and in a first plane extending at an angle to said given plane;

a second drive plate located adjacent the second punch assembly, and engaging the second punches; and drive means connected to the die plate, the punch assemblies and the first drive plate to rotate said die plate, said punch assemblies and said first drive plate;

wherein the connecting assembly connects each of the first punches to the base member for limited swinging movement in any direction transverse to an axis extending through said each first punch, perpendicular to the drive plate, to maintain said each first punch axially aligned with the associated one of the die cavities as the die plate and the first drive plate rotate; and wherein as the die plate, the punch assemblies and the first drive plate rotate, the first drive plate reciprocates the first punches and the second drive plate reciprocates the second punches to force food material into the die cavities, to mold the food material into tablets and then to eject the tablets from the die cavities.

2. A press according to claim 1, wherein the connecting assembly includes a multitude of connecting subassemblies, each of the connecting subassemblies releasably locking a respective one of the first punches to the base member.

3. A press according to claim 2, wherein:
the base member forms a multitude of spaced apart through openings;
each first punch includes a stem and a head;
the head of each first punch is located in a respective one through opening of the base member; and
each connecting subassembly locks the head of a respective one first punch in the through opening in which said head is located.

4. A press according to claim 3, wherein each of the connect subassemblies includes:
a first retainer member held against a first side of the base member, and forming an opening aligned with a respective one through opening of the base member;
a second retainer member held against a second side of the base member, and extending over said respective one through opening and the punch head locked therein; and
means releasably clamping the first and second retainer members onto the base member.

5. A press according to claim 3, wherein each of the connecting subassemblies includes
a first leg held against a first side of the base member, and forming an opening aligned with a respective one through opening of the base member;
a second leg held against a second side of the base member, and extending over said respective one through opening and the punch head locked therein;
a connecting leg integrally connected to both the first and second legs; and
means releasably clamping the first and second legs onto the base member.

6. A press according to claim 2, wherein:
the base member forms a series of first through openings spaced apart on a first circle, and further forms a series of second through openings spaced apart on a second circle;
each first punch includes a stem and a head;
the head of each first punch is located in a respective one first through opening;
each connecting subassembly locks the head of a respective one first punch in the through opening in which said head is located, and each connecting subassembly includes
i) a first retainer member held against a first side of the base member, forming a first opening aligned with a respective one first through opening of the base member, and forming a second opening aligned with a respective one second through opening of the base member,
ii) a second retainer member held against a second side of the base member, extending over said respective one first through opening and the punch head locked therein, and forming an opening aligned with said respective one second through opening of the base member, and
iii) means extending through the second opening of the first retainer member and through the opening of the second retainer member to releasably clamp said first and second retainer members onto the base member.

7. A press for compressing a food material, comprising:
a support frame;
a die plate supported by the support frame for rotation in a given plane and about a given axis, and forming a multitude of die cavities for receiving the food material;
food supply means to conduct food material to the die cavities from a source of the food material;
a first punch assembly rotatably supported by the support frame, and located on a first side of the die plate, and including a multitude of first punches supported for axial reciprocating movement, each of the first punches axially extending in a direction substantially perpendicular to said given plane, and being aligned with and supported for axial reciprocating movement in an associated respective one of the die cavities;
a second punch assembly rotatably supported by the support frame, and located on a second side of the die plate, and including a multitude of second punches supported for axial reciprocating movement, each of the second punches axially extending in a direction substantially perpendicular to said given plane, and being aligned with and supported for axial reciprocating movement in an associated respective one of the die cavities;
a first drive plate located adjacent the first punch assembly, and including
i) a first base member, and
ii) a first connecting assembly connecting the first punches to the first base member for rotary and axial movement therewith to move the first punches toward and away from said given plane as the base member rotates;
means supporting the first drive plate for rotation about the given axis and in a first plane extending at an angle to said given plane;
a second drive plate located adjacent the second punch assembly, and including
i) a second base member, and
ii) a second connecting assembly connecting the second punches to the second base member for rotary and axial movement therewith to move the second punches toward and away from said given plane as the second base member rotates;
means supporting the second drive plate for rotation about the given axis and in a second plane extending at an angle to said given plane; and
drive means connected to the die plate, the punch assemblies and the first and second drive plates to rotate said die plate, said punch assemblies and said drive plates;
wherein the first connecting assembly connects each of the first punches to the first base member for limiting swinging movement in any direction transverse to an axis extending through said each first punch and perpendicular to the first drive plate, and the second connecting assembly connects each of the second punches to the second base member for limited swinging movement in any direction transverse to an axis extending through said each second punch and perpendicular to the second drive plate, to maintain said each first punch and said each second punch axially aligned with the associated one of the die cavities as the die plate and the first and second drive plates rotate; and wherein as the die plate, the punch assemblies and the drive plates rotate, the first drive plate reciprocates the first punches and the second drive plate reciprocates the second punches to force food material into the die cavities, to mold the food material into tablets and then to eject the tablets from the die cavities.

8. A press according to claim 7, wherein:

the first connecting assembly includes a multitude of first subassemblies, each of the first subassemblies releasably locking a respective one of the first punches to the first base member; and the second connecting assembly includes a multitude of second subassemblies, each of the second subassemblies releasably locking a respective one of the second punches to the second base member.

9. A press according to claim 8, wherein:

the first base member forms a multitude of spaced apart first through openings;

the second base member forms a multitude of spaced apart second through openings;

each first punch includes a stem and a head; each second punch includes a stem and a head;

the head of each first punch is located in a respective one of the first through openings;

the head of each second punch is located in a respective one of the second through openings;

each first subassembly locks the head of a respective one first punch in the through opening in which said head is located;

each second subassembly locks the head of a respective one second punch in the through opening in which said head is located.

10. A press according to claim 9, wherein:

each of the first subassemblies is releasably clamped onto the first base member; and each of the second subassemblies is releasably clamped onto the second base member.

11. A press for compressing a food material, comprising:

a support frame;

a die plate supported by the support frame for rotation in a given plane and about a given axis, and forming at least a first die cavity for receiving the food material;

food supply means to conduct food material to the die cavity from a source of the food material;

at least a first punch axially extending in a direction substantially perpendicular to said given plane, and aligned with and supported for axial reciprocating movement in said first die cavity;

a first drive plate including
i) a base member, and
ii) a connecting assembly connecting the first punch to the base member for rotary and axial movement therewith to move the first punch toward and away from said given plane as the base member rotates;

means supporting the first drive plate for rotation about the given axis and in a first plane extending at an angle to said given plane; and drive means connected to the die plate and the first drive plate to rotate said die plate and said drive plate;

wherein the connecting assembly connects the first punch to the base member for limited swinging movement in any direction transverse to an axis extending through said first punch and perpendicular to the drive plate, to maintain the first punch axially aligned with the first die cavity as the die plate and the drive plate rotate; and wherein as the die plate and the drive plate rotate, the drive plate reciprocates the first punch to force food material into the die cavity, to mold the food material therein into a tablet and then to eject the tablet from the die cavity.

12. A press according to claim 11, wherein the connecting assembly releasably locks the first punch to the base member.

13. A press according to claim 12, wherein:

the base member forms at least a first through opening;

the first punch includes a stem and a head;

the head of the first punch is located in the first through opening; and the connecting assembly locks the head of the first punch in the first through opening.

14. A press according to claim 13, wherein the connecting assembly is releasably connected to the base member.

15. A press according to claim 14, wherein the connecting assembly includes:

a first retainer member held against a first side of the base member, and forming an opening aligned with the first opening of the base member;

a second retainer member held against a second side of the base member, and extending over the first opening of the base member and the head of the first punch; and means releasably clamping the first and second retainer members onto the base member.

* * * * *